United States Patent [19]
Swift et al.

[11] Patent Number: 6,011,581
[45] Date of Patent: *Jan. 4, 2000

[54] INTELLIGENT METHOD AND SYSTEM FOR PRODUCING AND DISPLAYING STEREOSCOPICALLY-MULTIPLEXED IMAGES OF THREE-DIMENSIONAL OBJECTS FOR USE IN REALISTIC STEREOSCOPIC VIEWING THEREOF IN INTERACTIVE VIRTUAL REALITY DISPLAY ENVIRONMENTS

[75] Inventors: David C. Swift, Ossining; Sadeg M. Faris, Pleasantville, both of N.Y.

[73] Assignee: Reveo, Inc., Hawthorne, N.Y.

[ * ] Notice: This patent is subject to a terminal disclaimer.

[21] Appl. No.: 08/375,905

[22] Filed: Jan. 20, 1995

Related U.S. Application Data

[63] Continuation-in-part of application No. 08/339,986, Nov. 14, 1994, Pat. No. 5,502,481, application No. 08/126,077, Sep. 23, 1993, Pat. No. 5,537,144, application No. 08/269, 202, Jun. 30, 1994, abandoned, and application No. 07/976, 518, Nov. 16, 1992, Pat. No. 5,553,203.

[51] Int. Cl.[7] .................................................. H04N 13/04
[52] U.S. Cl. ............................... 348/58; 345/55; 345/43; 395/119; 382/154
[58] Field of Search .................................... 348/42, 51, 1, 348/60; 345/139; 395/119, 120, 127, 125; 382/154, 285; 434/40, 43; H04N 13/04, 13/00

[56] References Cited

U.S. PATENT DOCUMENTS

| | | | |
|---|---|---|---|
| 4,649,425 | 3/1987 | Pund | 348/52 |
| 4,984,179 | 1/1991 | Waldern | 348/54 |
| 4,987,487 | 1/1991 | Ichinose et al. | 348/59 |
| 5,315,377 | 5/1994 | Isono et al. | 348/51 |

Primary Examiner—Michael N. Lee
Attorney, Agent, or Firm—Thomas J. Perkowski

[57] ABSTRACT

An intelligent system and process for producing and displaying stereoscopically-multiplexed images of either real or synthetic 3-D objects, for use in realistic stereoscopic viewing thereof. The system comprises a subsystem for acquiring parameters specifying the viewing process of a viewer positioned relative to a display surface associated with a stereoscopic display subsystem. A computer-based subsystem is provided for producing stereoscopically-multiplexed images of either the real or synthetic 3-D objects, using the acquired parameters. The stereoscopically-multiplexed images are on the display surface, for use in realistic stereoscopic viewing of either the real or synthetic 3-D objects, by the viewer.

19 Claims, 14 Drawing Sheets

INTELLIGENT METHOD AND SYSTEM FOR PRODUCING AND DISPLAYING STEREOSCOPICALLY-MULTIPLEXED IMAGES OF THREE-DIMENSIONAL OBJECTS FOR USE IN REALISTIC STEREOSCOPIC VIEWING THEREOF IN INTERACTIVE VIRTUAL REALITY DISPLAY ENVIRONMENTS

RELATED CASES

This patent application is a Continuation-in-Part of patent application Ser. No. 08/339,986 entitled "Desktop-Based Projection Display System For Stereoscopic Viewing of Displayed Imagery Over A Wide Field Of View" filed Nov. 14, 1994 by Dentinger, et al., now U.S. Pat. No. 5,502,481; patent application Ser. No. 08/126,077 entitled "A System for Producing 3-D Stereo Images" filed Sep. 23, 1993 by Sadeg M. Faris, now U.S. Pat. No. 5,537,144; patent application Ser. No. 08/269,202 entitled "Methods for Manufacturing Micro-Polarizers" filed on Jun. 30, 1994, abandoned by Sadeg M. Faris; and patent application Ser. No. 07/976,518 entitled "Method and Apparatus for Producing and Recording Spatially-Multiplexed Images for Use in 3-D Stereoscopic Viewing Thereof" filed Nov. 16, 1992 by Sadeg M. Faris, now U.S. Pat. No. 5,553,203. Each of these patent applications is incorporated herein by reference in its entirety.

BACKGROUND OF THE INVENTION

1. Field of Invention

The present invention relates to an improved method and system for producing stereoscopically-multiplexed images from stereoscopic image-pairs and displaying the same stereoscopically, in an interactive manner that allows viewers to perceive displayed imagery with a sense of realism commensurate with natural viewing of physical reality.

2. Brief Description of State of the Art

In the contemporary period, stereoscopic display systems are widely used in diverse image display environments, including virtual-reality applications. The value of such image display systems resides in the fact that viewers can view objects with depth perception in three-dimensional space.

In general, stereoscopic image display systems display pairs of stereoscopic images (i.e. stereoscopic image-pairs) to the eyes of human viewers. In principle, there are two ways in which to produce stereoscopic image-pairs for use in stereoscopic display processes. The first technique involves using a "real" stereoscopic-camera, positioned with respect to a real 3-D object or scene, in order to acquire each pair of stereoscopic images thereof. The second techniques involves using a computer-based 3-D modeling system to implement a "virtual" stereoscopic-camera, positioned with respect to a (geometric) model of a 3-D object or scene, both represented within the 3-D modeling system. In the first technique, it is necessary to characterize the real-image acquisition process by specifying the camera-parameters of the real stereoscopic-camera used during the image acquisition process. In the second technique, it is necessary to characterize the virtual-image acquisition process by specifying the "camera-parameters" of the virtual stereoscopic-camera used during the image acquisition process. In either case, the particular selection of camera parameters for either the real or virtual stereoscopic-camera necessarily characterizes important properties in the stereoscopic image-pairs, which are ultimately stereoscopically-multiplexed, using one or another format, prior to display.

Presently, there are several known techniques for producing "spectrally-multiplexed images", i.e. producing temporal-multiplexing, spatial-multiplexing and spectral-multiplexing.

Presently, there exist a large number of prior art stereoscopic display systems which use the first technique described above in order to produce stereoscopically-multiplexed images for display on the display surfaces of such systems. In such prior art systems, the viewer desires to view stereoscopically, real 3-D objects existing in physical reality. Such systems are useful in laprascopic and endoscopic surgery, telerobotics, and the like. During the stereoscopic display process, complementary stereoscopic-demultiplexing techniques are used in order to provide to the left and right eyes of the viewer, the left and right images in the produced stereoscopic image-pairs, and thus permit the viewer to perceive full depth sensation. However, the selection of camera parameters used to produce the displayed stereoscopic image-pairs rarely, if ever, correspond adequately with the "viewing parameters" of the viewer's, human vision system, which ultimately views the displayed stereoscopic image-pairs on the display surface before which the viewer resides.

Also, there exist a large number of prior art stereoscopic display systems which use the second technique described above in order to produce stereoscopically-multiplexed images for display on the display surfaces of such systems. In such systems, the viewer desires to view stereoscopically, synthetic 3-D objects existing only in virtual reality. Such systems are useful in flight simulation and training, virtual surgery, video-gaming applications and the like. During the stereoscopic display process, complementary stereoscopic-demultiplexing techniques are also used to provide to the left and right eyes of the viewer, the left and right images in the produced stereoscopic image-par. However, the selection of camera parameters used to produce the displayed stereoscopic image-pairs in such systems rarely, if ever, correspond adequately with the viewing parameters of the viewer's human vision system, which ultimately views the displayed stereoscopic image-pairs on the display surface before which the viewer resides.

Consequently, stereoscopic viewing of either real or synthetic 3-D objects in virtual reality environments, using prior art stereoscopic image production and display systems, have generally lacked the sense of realism otherwise experienced when directly viewing real 3-D scenery or objects in physical reality environments.

Thus there is a great need in the art for a stereoscopic image production and display system having the functionalities required in high performance virtual-reality based applications, while avoiding the shortcomings and drawbacks associated with prior art systems and methodologies.

OBJECTS AND SUMMARY OF THE INVENTION

Accordingly, it is a primary object of the present invention to provide an interactive-based system for producing and displaying stereoscopically-multiplexed images of either real or synthetic 3-D objects that permits realistic stereoscopic viewing thereof, while avoiding the shortcomings and drawbacks of prior art systems and methodologies.

Another object of the present invention is to provide such a system, in which the true viewing parameters of the viewer, including head/eye position and orientation, are continuously acquired relative to the display surface of the stereoscopic display subsystem and used during the producing of stereoscopically-multiplexed images of synthetic 3-D objects being stereoscopically viewed by the viewer in a virtual reality (VR) viewing environment, such as presented in flight simulation and training, virtual surgery, video-gaming and like applications.

A further object of the present invention is to provide such a system, in which the true viewing parameters of the viewer, including head/eye position and orientation, are continuously acquired relative to the display surface of the stereoscopic display subsystem and used during the producing of stereoscopically-multiplexed images of real 3-D objects being stereoscopically viewed by the viewer in a virtual reality (VR) viewing environment, such as presented in laprascopic and endoscopic surgery, telerobotic and like applications.

Another object of the present invention is to provide such a system, in which the stereoscopically-multiplexed images are spatially-mulitplexed images (SMIs) of either real or synthetic 3-D objects or scenery.

Another object of the present invention is to provide a process for producing and displaying, in real-time, spatially-mulitplexed images (SMIs) of either real or synthetic 3-D objects or scenery, wherein the true viewing parameters of the viewer, including head/eye position and orientation, are continuously acquired relative to the display surface of the stereoscopic display subsystem and used during the producing of stereoscopically-multiplexed images of either the real or synthetic 3-D objects being stereoscopically viewed by the viewer in a virtual reality (VR) viewing environment.

Another object of the present invention is to provide a stereoscopic camera system which is capable of acquiring, on a real-time basis, stereoscopic image-pairs of real 3-D objects and scenery using camera parameters that correspond to the range of viewing parameters that characterize the stereoscopic vision system of typical human viewers.

Another object of the present invention is to provide a system of compact construction, such as notebook computer, for producing and displaying, in real-time, micropolarized spatially-mulitplexed images (SMIs) of either real or synthetic 3-D objects or scenery, wherein the true viewing parameters of the viewer, including head/eye position and orientation, are continuously acquired relative to the display surface of the portable computer system and used during the production of spatially-multiplexed images of either the real or synthetic 3-D objects being stereoscopically viewed by the viewer in a virtual reality (VR) viewing environment, wearing a pair of electrically-passive polarizing eye-glasses.

Another object of the present invention is to provide such a system in the form of a desktop computer graphics workstation, particularly adapted for use in virtual reality applications.

It is yet a further object of the present invention to provide such a system and method that can be carried out using other stereoscopic-multiplexing techniques, such as time-sequential (i.e. field-sequential) multiplexing or spectral-multiplexing techniques.

Another object of the present invention is to provide a stereoscopic display system as described above, using either direct or projection viewing techniques, and which can be easily mounted onto a moveable support platform and thus be utilizable in flight-simulators, virtual-reality games and the like.

A further object of the present invention is to provide a stereoscopic-multiplexing image production and display system which is particularly adapted for use in scientific visualization of diverse data sets, involving the interactive exploration of the visual nature and character thereof.

These and other objects of the present invention will become apparent hereinafter and in the claims to invention.

BRIEF DESCRIPTION OF THE DRAWINGS

For a more complete understanding of the Objects of the Present Invention, the Detailed Description of the Illustrated Embodiments should be read in conjunction with the accompanying Drawings, in which.

DETAILED DESCRIPTION OF THE ILLUSTRATED EMBODIMENTS

Figure 1:
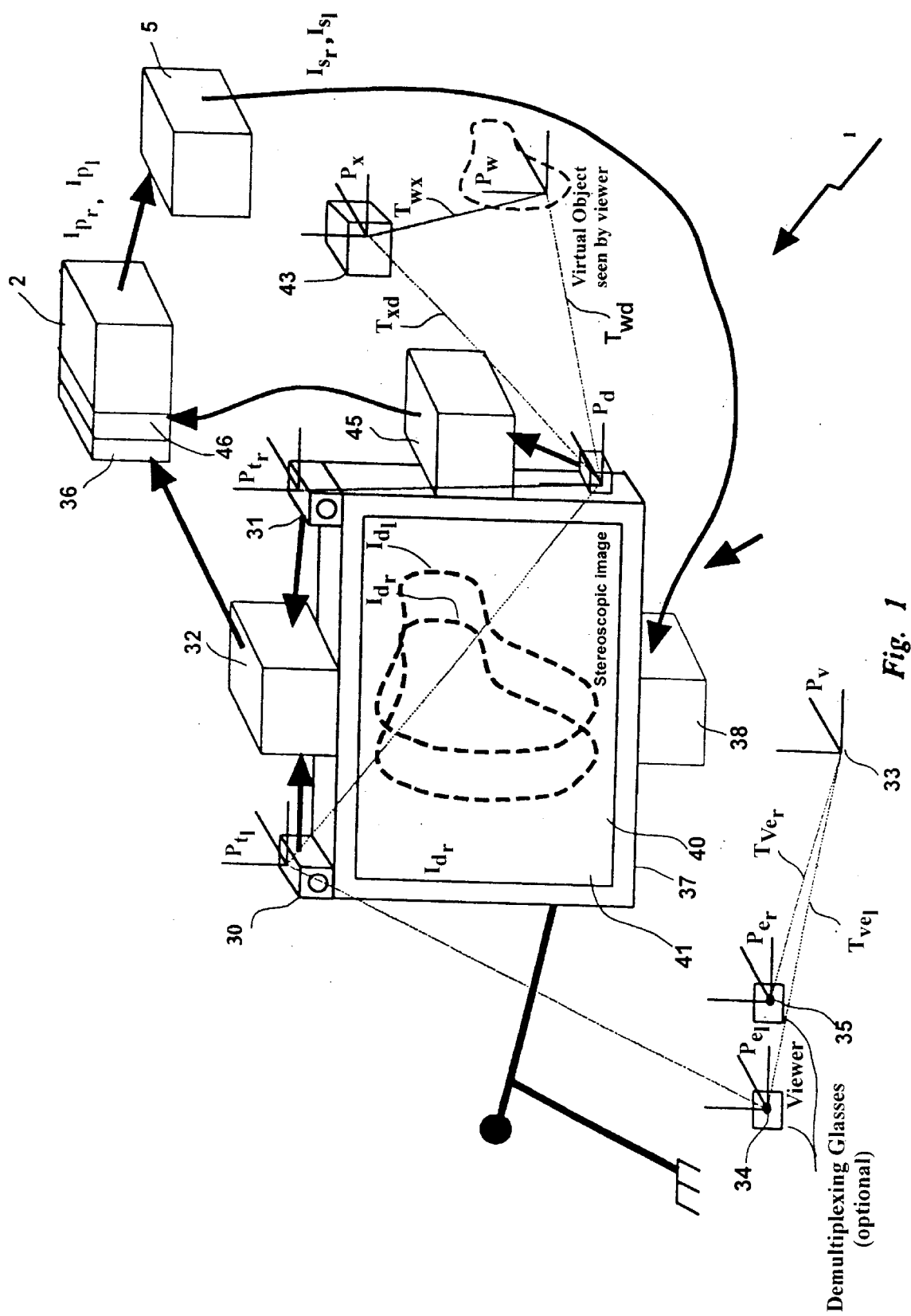
FIG. 1 is a perspective view of the interactive-based, stereoscopically-multiplexed image production and display system of the present invention, showing the various subsystems, subcomponents, and coordinate reference systems embedded therein, in relation to each other and a viewer wearing a pair of electrically-passive polarization spectacles in front of his or her eyes, and being free to move with respect to the LCD display surface of the stereoscopic image-pair display subsystem.
Figure 2:
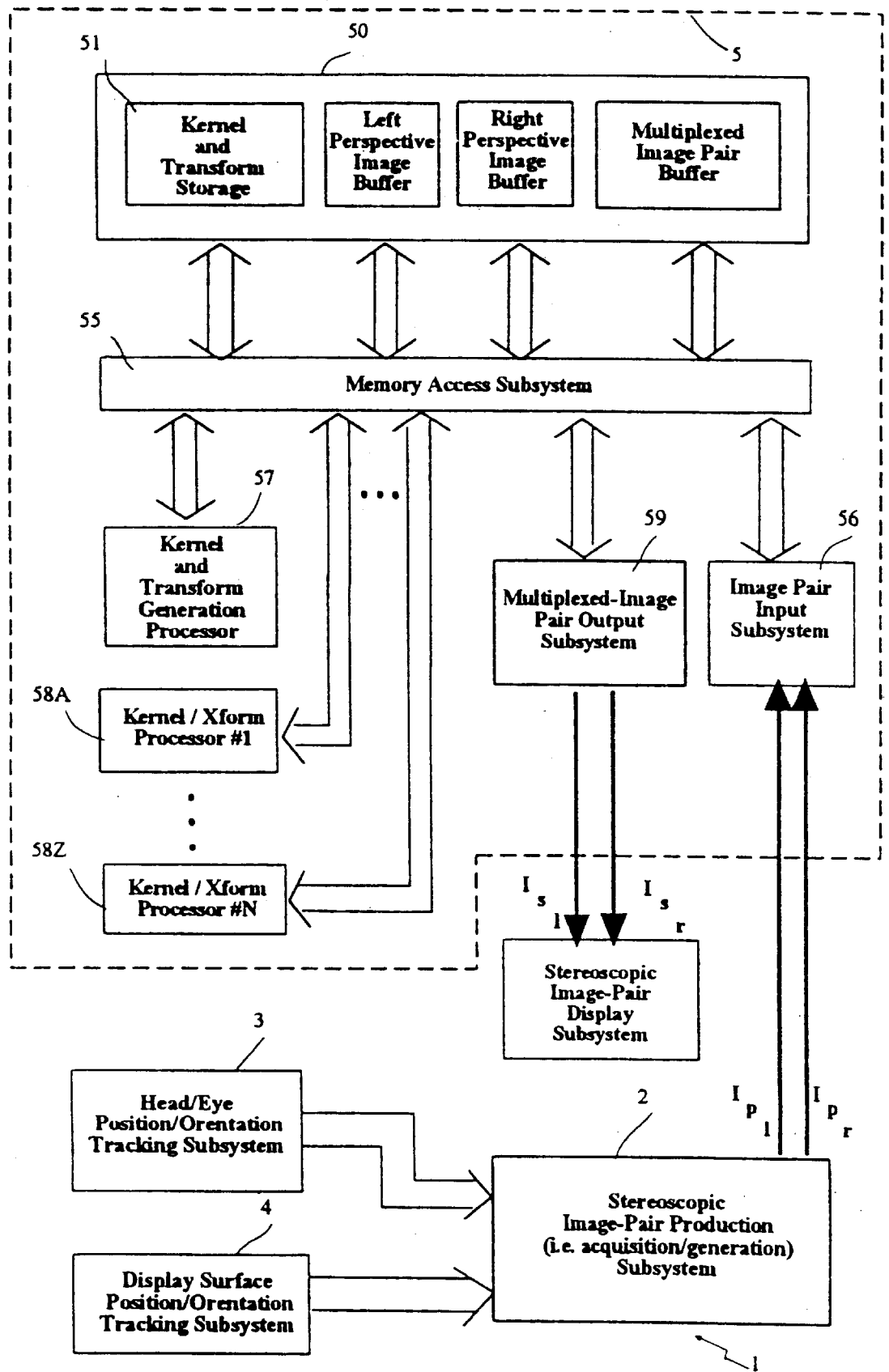
FIG. 2 is a block system diagram of the stereoscopically-multiplexed image production and display system of the present invention, showing the stereoscopic image-pair production subsystem, eye/head position and orientation tracking subsystem, the display surface position and orientation tracking subsystem, the stereoscopic image-multiplexing subsystem, and the stereoscopic image-pair display subsystem thereof.
Figure 2A:
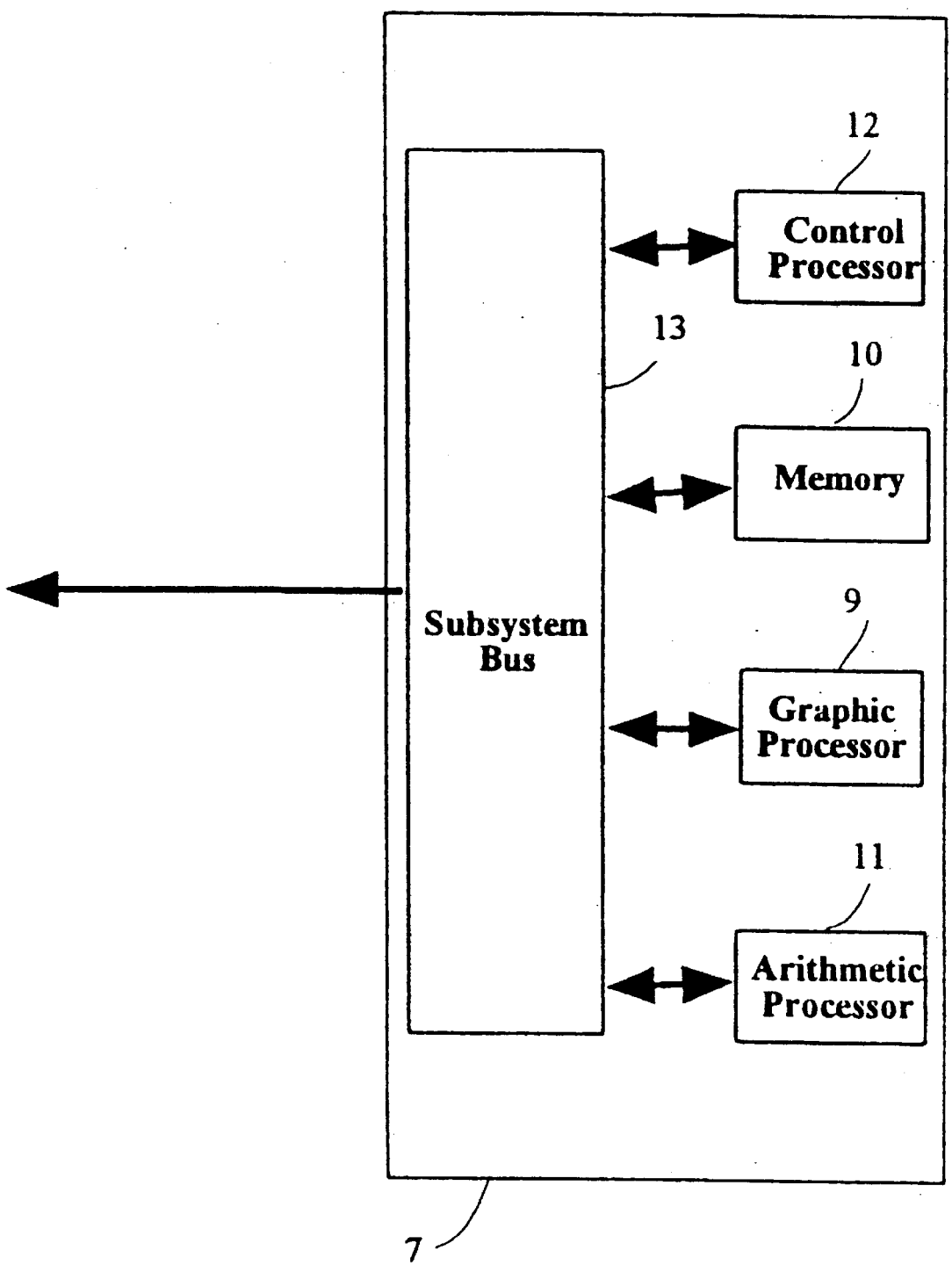
FIG. 2A is a block functional diagram of the stereoscopically-multiplexed image generation subsystem of the stereoscopically-multiplexed image production subsystem of the present invention.
Figure 2B:
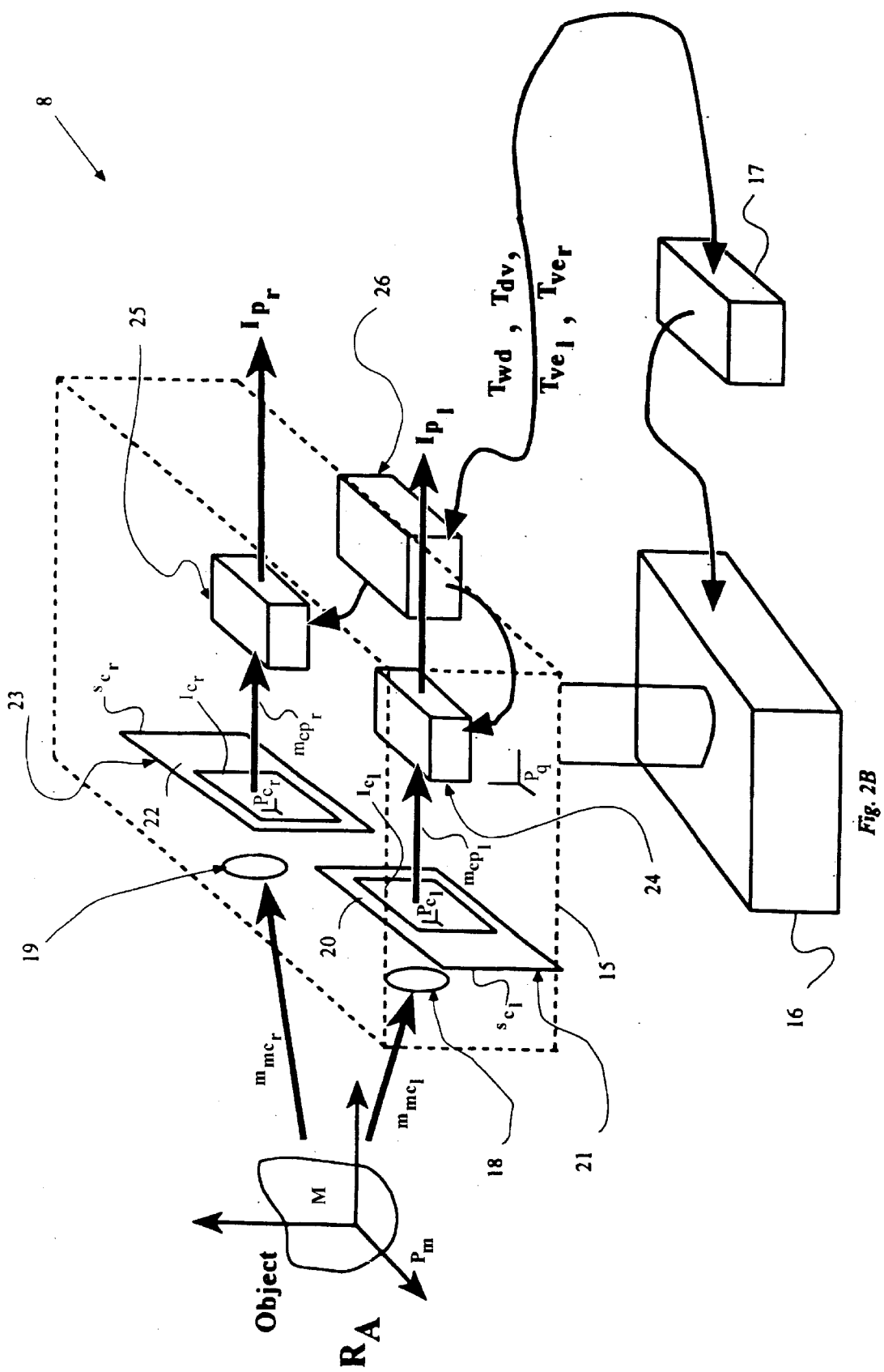
FIG. 2B is a schematic representation of the stereoscopically-multiplexed image acquisition subsystem of the stereoscopically-multiplexed image production subsystem of the present invention.
Figure 2C:
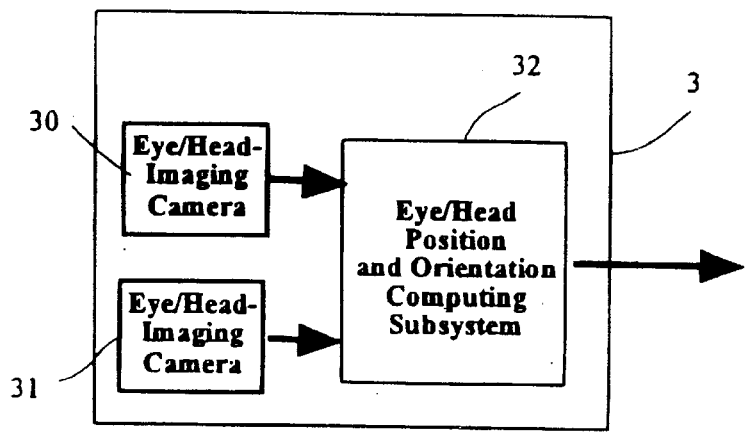
FIG. 2C is a block functional diagram of the eye/head position and orientation tracking subsystem of the present invention.
Figure 2D:
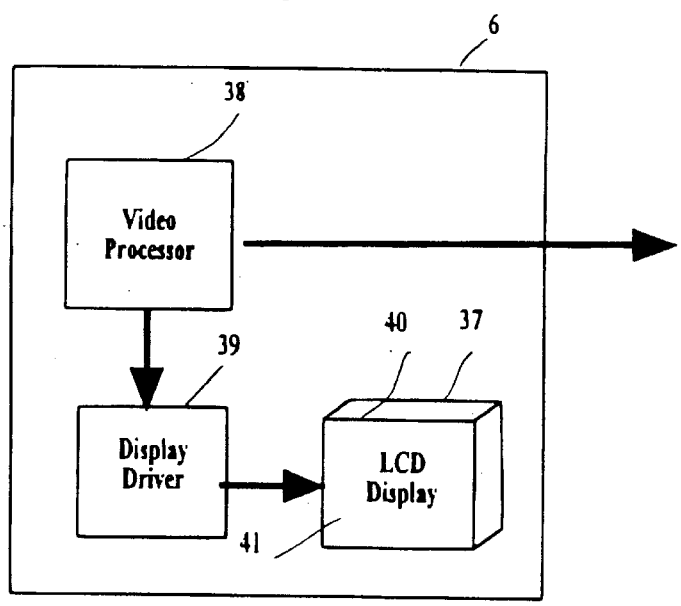
FIG. 2D is a block functional diagram of the stereoscopically-multiplexed image display subsystem of the present invention.
Figure 2E:
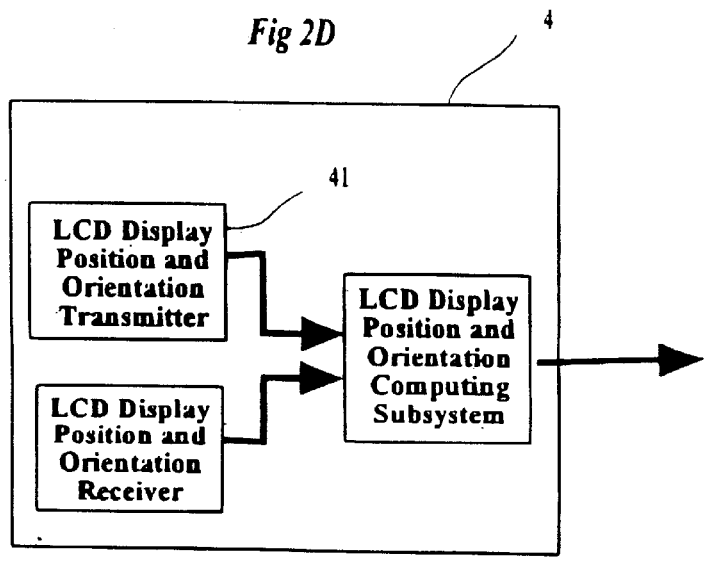
FIG. 2E is a block functional diagram of the display-surface position and orientation tracking subsystem of the present invention.

Referring to FIGS. 1 through 2E, the apparatus of the present invention will be described in great detail hereinbelow. In the illustrative embodiment, the apparatus of the present invention is realized in the form of an interactive-based stereoscopically-multiplexed image production and display system. It is understood, however, that the present embodiment may be embodied in other systems without departing from the scope and spirit of the present invention.

The system and method of the present invention may utilize any one or a number of available stereoscopically-multiplexing techniques, such as temporal-multiplexing (i.e. multiplexing), spatial-multiplexing or spectral-multiplexing. For purposes of illustration, spatial-multiplexing will be described. It is understood, that when using other stereoscopic display techniques to practice the system and method of the present invention, various modifications will need to be made. However, after having read the teachings of the present disclosure, such modifications will be within the knowledge of one of ordinary skill in the art.

As shown in FIGS. 1 and 2, the system of the present invention, indicated by reference numeral; generally comprises several major components, namely: stereoscopic image-pair production subsystem 2; eye/head position and orientation tracking subsystem 3; display surface (panel) position and orientation tracking subsystem 4; stereoscopically-multiplexed image production subsystem 5; and the stereoscopically-multiplexed image display subsystem 6. As shown in FIG. 1 and FIGS. 2C–2E, eye/head position and orientation tracking subsystem 3, display surface (panel) position and orientation tracking subsystem 4, and the stereoscopically-multiplexed image display subsystem 6 cooperate together to provide an interactive-based stereoscopically-multiplexed image display subsystem. The various functionalities of these subsystems will be described in great detail below.

It is understood there will be various embodiments of the system of the present invention depending on whether stereoscopic image-pairs (comprising pixels selected from left and right perspective images) are to be produced from either (i) real 3-D objects or scenery existing in physical reality or (ii) virtual (synthetic) 3-D objects or scenery existing in virtuality. In either event, the real or synthetic 3-D object will be referenced to a three-dimensional coordinate system PM. As used hereinafter, all processes relating to the production of stereoscopic image-pairs shall be deemed to occur within "3-D Image-Pair Production Space (RA)" indicated in FIGS. 3A, 5A, and 6A; conversely, all processes relating to the viewing of stereoscopic image-pairs shall be deemed to occur within "3-D Image-Pair Display Space (RB)" also indicated in FIGS. 3A, 5A, and 6A. Notably, it is within "3-D Image-Pair Display Space", that the viewer actually resides and perceives stereoscopically, with 3-D depth sensation and photo-realism, virtual 3-D objects corresponding to either real or synthetic 3-D objects, from which the displayed stereoscopic image-pairs perceived by the viewer have been produced in 3-D Image-Pair Production Space.

In general, stereoscopically-multiplexed image production subsystem 2 may include a stereoscopic-image pair generating (i.e. computing) subsystem 7 illustrated in FIG. 2A, and or a stereoscopic image-pair acquisition subsystem 8 as illustrated in FIG. 2B. Preferably, both subsystems are available to stereoscopic image-pair production subsystem 2, as this permits the production of stereoscopic image-pairs from either real and/or synthetic 3-D objects and scenery, as may be required in various present and future VR-applications.

In general, computer models of synthetic objects in 3-D Image Production Space (RA) may be represented using conventional display-list graphics techniques (i.e. using lists of 3-D geometric equations and parameters) or voxel-based techniques. As illustrated in FIG. 2A, stereoscopic image-pair generating (i.e. computing) subsystem 7 can produce stereoscopic image-pairs from display-list graphics type models and may be realized using a serial or parallel computing platform of sufficient computational performance. In FIG. 2A, one serial computing platform, based on the well know Von Neumann architecture, is show for use in implementing this subsystem. As shown, subsystem 7 of the illustrative embodiment comprises a graphics processor 9, information memory 10, arithmetic processor 11, control processor 12 and a system bus 13, arranged as shown and constructed in a manner well known in the art. Commercially available computing systems that may be used to realize this subsystem include the ONYX, POWER INDIGO2 and CHALLENGE computing systems from Silicon Graphics, Inc. of Mountain View, Calif.

Alternatively, voxel-based models (m) of synthetic objects may be created using a parallel computing system of the type disclosed in U.S. Pat. No. 5,361,385 to Bakalash entitled "Parallel Computing System For Volumetric Modeling, Data Processing and Visualization" incorporated herein by reference in its entirety. When using voxel-based models of real or synthetic 3-D objects, suitable modifications will be made to the mapping processes mmcl and mmcr generally illustrated in FIG. 3A.

As illustrated in FIG. 2B, the stereoscopic image-pair acquisition subsystem 8, of the stereoscopic image-pair production subsystem 2, comprises a number of subcomponents, namely: a miniature optical platform 15 with embedded coordinate system pq, for supporting the miniature optical and electro-optical components of subsystem 8; a 3-axis platform translation mechanism 16, for rapidly translating the optical platform 15 with respect to the real object M relative to its embedded coordinate system pm, in response to translation signals produced from platform rotation and position processor 17; left and right perspective image-forming optical assemblies 18 and 19, respectively, for forming left and right wide-angle images 20 and 27 of a real object M situated in coordinate system pm, imaged from left and right viewing perspectives specified by viewing mappings mmcl and mmcr; left and right image detection/quantization/sampling panels 21 and 23, for detecting, quantizing and spatially sampling the left and right wide-angle perspective images formed thereon by wide angle optical assemblies 18 and 19, respectively, and thereby producing a quantized image representation of the left and right perspective images as if viewed by the image-acquisition subsystem using camera parameters specified by transformations Twd, Tdv, Tvel, Tver; left and right image scanner/processors 24 and 25, respectively, for scanning and processing the left and right quantized image representations produced by left and right image detection/quantization/sampling panels 21 and 23, respectively, so as to produce stereoscopic image-pairs {Ipl, Ipr}, on a real-time basis. Notably, the function of stereoscopic image-acquisition subsystem 8 is to produce stereoscopic image-pairs viewed using a set of camera parameters that correspond to the viewing parameters of the binocular vision system of the human being viewing the display surface of the system. The structure and function of this subsystem will be described in greater detail below.

As shown in FIG. 2B the object, M, is optically imaged on the right quantization sampler surface, scr, through the right wide angle imaging optics. This optical imaging is represented by the mapping mmcr. The right quantization sampler 23 converts the optical image formed on the surface scr into a pixelized image representation using a quantization mapping mcpr. The right quantization sampler 23 can be implemented with CCD (charge coupled device) sensor technology which is well known. The quantization mapping, mcpr, determines which portion of the optical image falling on surface scr, shown as image Icr (with imbedded reference frame pcr), to quantize and is defined by the right and left quantization mapping processor. The right pixel/scanner processor 25 scans the image Icr to produce the pixelized image Ipr.

In a similar manner, the object, M, is optically imaged on the left quantization sampler 21 surface, scl, through the left wide-angle imaging optics 18. This optical imaging is represented by the mapping mmcl. The left quantization sampler 21 converts an optical image formed on the surface scl into a pixelized image representation using a quantization mapping mcpl. The left quantization sampler can be implemented with CCD (charge coupled device) sensor technology which is well known. The quantization mapping, mcpl, determines which portion of the optical image falling on surface scl, shown as image Icl (with imbedded reference frame pcl), to quantize and is defined by the right and left quantization mapping processor 25. The left pixel/scanner processor 24 scans the image Icl to produce pixelized image Ipl.

The right and left quantization mapping processors 24 and 25 receive as input, the eye/head/display tracking information (i.e. transformations Twd, Tdv, Tvel, and Tver), which are used to define the right and left quantization mappings, mcpr and mcpl, respectively. Not only do these two quantization mappings define the quantization of the images Icr and Icl, respectively, they also define the size and location of the images Icr and Icl, respectively, on the surfaces scr and scl, respectively. The size and location of the images Icr and Icl, within the surfaces scr and scl, defines which portions of the physical object, M, imaged on the quantization samplers are represented by the output images Ipr and Ipl. This flexibility of choosing the size and location of the images Icr and Icl allows each channel, right and left, of the stereoscopic image-acquisition subsystem 8 to independently "look at" or acquire different portions, along a viewing direction, of the imaged object M with the above-described eye/head/display tracking information. In the illustrated embodiment, the mappings mcpr and mcpl, the right and left pixel scanner/processors 24 and 25, and the right and left quantization mapping processors 21 and 23 are each implemented by non-mechanical means, thus making it possible to change the "looking" direction of Stereoscopic image acquisition subsystem speeds comparable or better than that of the human visual system.

The rotation and position processor 17 controls (i) the three axis "rotation" mechanism 16 (which is responsible for aiming the wide angle optics and the quantization samplers), and (ii) the 3 axis "translation" mechanism (which is responsible for moving the wide angle optics and the quantization samplers to different locations in the image acquisition space RA).

As illustrated in FIG. 2C, eye/head position and orientation tracking system 3 comprises a pair of miniature eye/head imaging cameras 30 and 31, and a eye/head position and orientation computing subsystem 32. The function of this system is to capture images of the viewers's head 33 and eyes 34 and 35, process the same in order to generate, on a real-time basis, head and eye position and orientation parameters for use in parameterizing the head/eye viewing transformation, Twd, required by stereoscopic image-pair production subsystem 8, as illustrated in the general and specific illustrative embodiments of FIGS. 1, 3A and 5A and 6A, respectively. As shown in FIG. 1, the left and right eyes of the viewer has an embedded coordinate reference system, indicated by pel and per, respectively, whereas the viewer's head has an embedded coordinate system pv, for referencing position and orientation parameters of the viewer's eyes and head with respect to such coordinate systems.

In the illustrative embodiment shown in FIG. 1, eye/head imaging cameras 30 and 31 are realized using a pair of infra-red cameras mounted upon an LCD display panel 37, which forms part of the stereoscopic image display subsystem 6. Notably, coordinate reference system ptl and ptr are embedded within the image detection surfaces of imaging camera 30 and 31, respectively. The eye/head position and orientation computing subsystem 32, preferably realized using microelectronic technology, is mounted to the display panel, as well. Head and eye position and orientation parameters, required for parameterizing the left eye viewing transform Tvel, right eye viewing transform Tver and head-display transform Tdv, are computed and subsequently transmitted to stereoscopic image production subsystem 2 preferably by way of electro-magnetic position/orientation signals, which are received at subsystem 2 using a base transceiver 36 well known in the art. For greater details regarding display position and orientation tracking subsystem 3, reference should be made to U.S. Pat. No. 5,305,012 issued Apr. 14, 1994 to Sadeg M. Faris, incorporated herein by reference, and to the prior art references cited therein relating to eye and head tracking technology commercially available from particular vendors.

As illustrated in FIG. 2D, stereoscopic image display subsystem 6 comprises a number of subcomponents, namely: a video display device 37, preferably realized as a planar high-resolution active matrix liquid crystal display (LCD) panel, capable of displaying color images at a high video rate; a video graphics processor 38 for converting stereoscopically-mulitplexed images (e.g. SMIs) into video signals adapted to the LCD panel 37; and display driver circuitry 39 for driving the pixels on the LCD panel 37 in response to the video signals produced from the video processor 38. In the illustrative embodiment of the present invention, shown in FIGS. 1, 5A–6B, a micropolarization panel 40 is directly mounted onto the planar display surface 41 of LCD panel 37 in order to impart polarization state P1 to pixels associated with the left perspective image in the produced stereoscopic image-pair, and to impart polarization state P2 to pixels associated with the right perspective image in the produced stereoscopic image-pair. The structure and function of micropolarization panel 40 is disclosed in copending application Ser. No. 08/126,077, supra, and may be made using manufacturing techniques disclosed in U.S. Pat. No. 5,327,285 granted to Sadeg M. Faris, and incorporated herein by reference in its entirety. Micropolarization panels of various sizes and spatial resolutions are commercially available from Reveo, Inc. of Hawthorne, N.Y., under the trademark $\mu$Pol™, and can be used to construct the stereoscopic display panel of the system of the present invention.

As illustrated in FIG. 2E, display position and orientation tracking system 4 comprises a number of spatially distributed components, namely: a display position and orientation signal transmitter 43 remotely located from display panel surface 41 and having embedded therein coordinate reference system px; a display position and orientation signal receiver 44 mounted on the display panel 37 and having embedded therein coordinate reference system pd; and a display position and orientation computing subsystem 45, realized using microelectronic technology, and mounted to the display panel as shown. The function of this system is to sense the position and orientation of the display surface 40 with respect to coordinate system px and to generate, on a real-time basis, head and eye position and orientation parameters, transformed to coordinate system px using homogeneous transformations well known in the art. In turn, these parameters are used in parameterizing the display viewing transformation, Twd, required by stereoscopic image-pair production subsystem 2, as illustrated in the general and specific illustrative embodiments of FIGS. 1, 3A and 5A and 6A, respectively.

The display position and orientation parameters, required for display viewing transform Twd, are transmitted to stereoscopic image production subsystem 2 preferably by way of electro-magnetic position/orientation signals, which are received at subsystem 2 using base transceiver 46 well known in the art.

As illustrated in FIG. 2, the stereoscopic image-multiplexing subsystem 5 hereof comprises a number of subcomponents, namely: shared memory subsystem 50 providing various memory storage structures including a Kernel and Transform storage unit 51, a left-respective image buffer 52, a right-perspective image buffer 53, and a multiplexed-image buffer 54; a memory access system 55 for accessing (i.e. storing and retrieving) information in various memory structures realized in shared memory subsystem 50; an image-pair input subsystem 56 for inputting the left and right perspective images of stereoscopic image-pairs, through memory access subsystem 55, to left and right perspective buffers 52 and 53, respectively; a kernel and transform generation processor 57 for generating kernel and transformed utilized through the system and process of the present invention; a plurality of N Kernel/Transform processors 58A to 58Z for processing pixelated data sets within quantized image respresenations of left and right perspective images, during the stereoscopic multiplexing processes of the present invention, to produce stereoscopically multiplexed images for display; and a multiplexed-image output subsystem 59 for outputting multiplexed-images (e.g. SMIs) from multiplexed-image buffer 54, to the stereoscopic image display subsystem 6 of the system.

Having described the structure and function of the stereoscopically-multiplexed image production and display system of the present invention, it is appropriate at this juncture to now describe the generalized and particular processes of the present invention which, when carried out on the above-described system in a real-time manner, support realistic stereoscopic viewing of real and/or synthetic 3-D objects by viewers who "visually interact" with the stereoscopic image display subsystem 6 thereof.

Figure 3A:
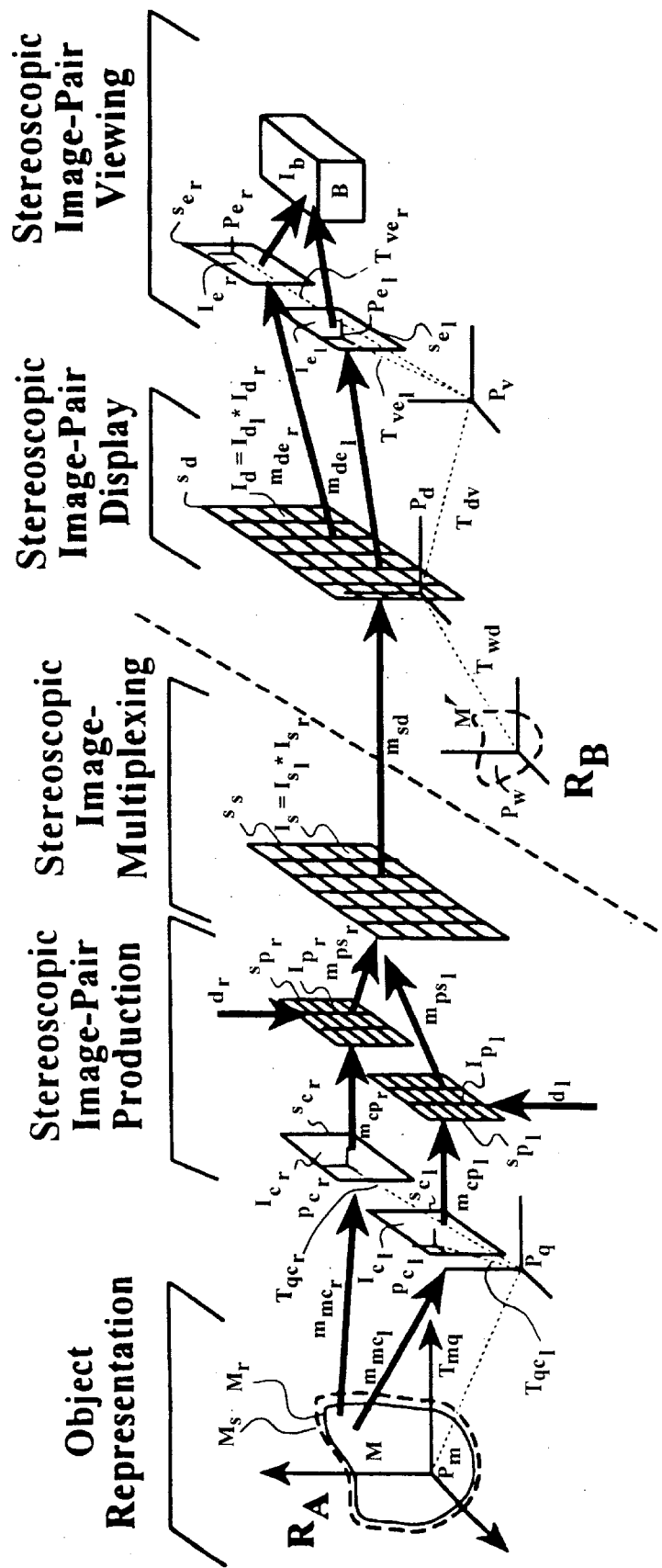
FIG. 3A is a schematic representation of the generalized stereoscopically-multiplexed image production, display and viewing process of the present invention, graphically illustrating the various projection and display surfaces, coordinate reference systems, transformations and mappings utilized in the process, wherein the 3-D object or scenery may exist either in physical reality, or in virtual reality represented within the stereoscopically-multiplexed image generation subsystem of the present invention.

In FIG. 3a, the five major sub-systems of a generalized embodiment of the system hereof is shown schematically, the object representation subsystem, the stereoscopic image-pair production subsystem, the stereoscopic image multiplexing subsystem, the stereoscopic image-pair display subsystem, and the stereoscopic image-pair viewing subsystem.

The object representation subsystem comprises means for dynamically changing of static object or objects, M, which can be either real physical objects, Mr, or synthetic objects, Ms. These objects, M, are referenced to the coordinate frame pm in the image acquisition space RA.

As illustrated in FIG. 3A, the stereoscopic image-pair production subsystem comprises the right and left object surfaces scr and scl (with imbedded coordinate frames pcr and pcl), the right and left pixel surfaces spr and spl, the right and left object mappings mmcr and mmcl, the right and left quanitization mappings mcpr and mcpl, the coordinate frame pq, and the supplemental right and left pixel information dr and dl. Coordinate frame pq is referenced with respect to the coordinate frame pm by the transformation Tmq.

The right object mapping, mmcr, creates an image representation, Icr, of M, onto the surface scr. In a similar manner, the left object mapping, mmcl, creates an image representation, Icl, of M, onto the surface scl. Both surfaces scr and scl are referenced with respect to coordinate frame pq by transformations Tqcr and Tqcl, respectively. The object mappings mmcr and mmcl can be either physical optical imaging mappings or virtual geometric mappings implemented with software or hardware. Images Icr and Icl (on surfaces scr and scl, respectively) can be represented by physical optical images or geometric representations (hardware or software). The images Icr and Icl taken together form the beginnings of a stereoscopic image-pair which represent a portion of the object(s) M. The transforms Tmq, Tqcr, and Tqcl and the mappings mmcr and mmcl are defined such that the resulting images Icr and Icl will lead to the creation of a realistic stereoscopic image-pair in later steps of this process.

Figure 4A:
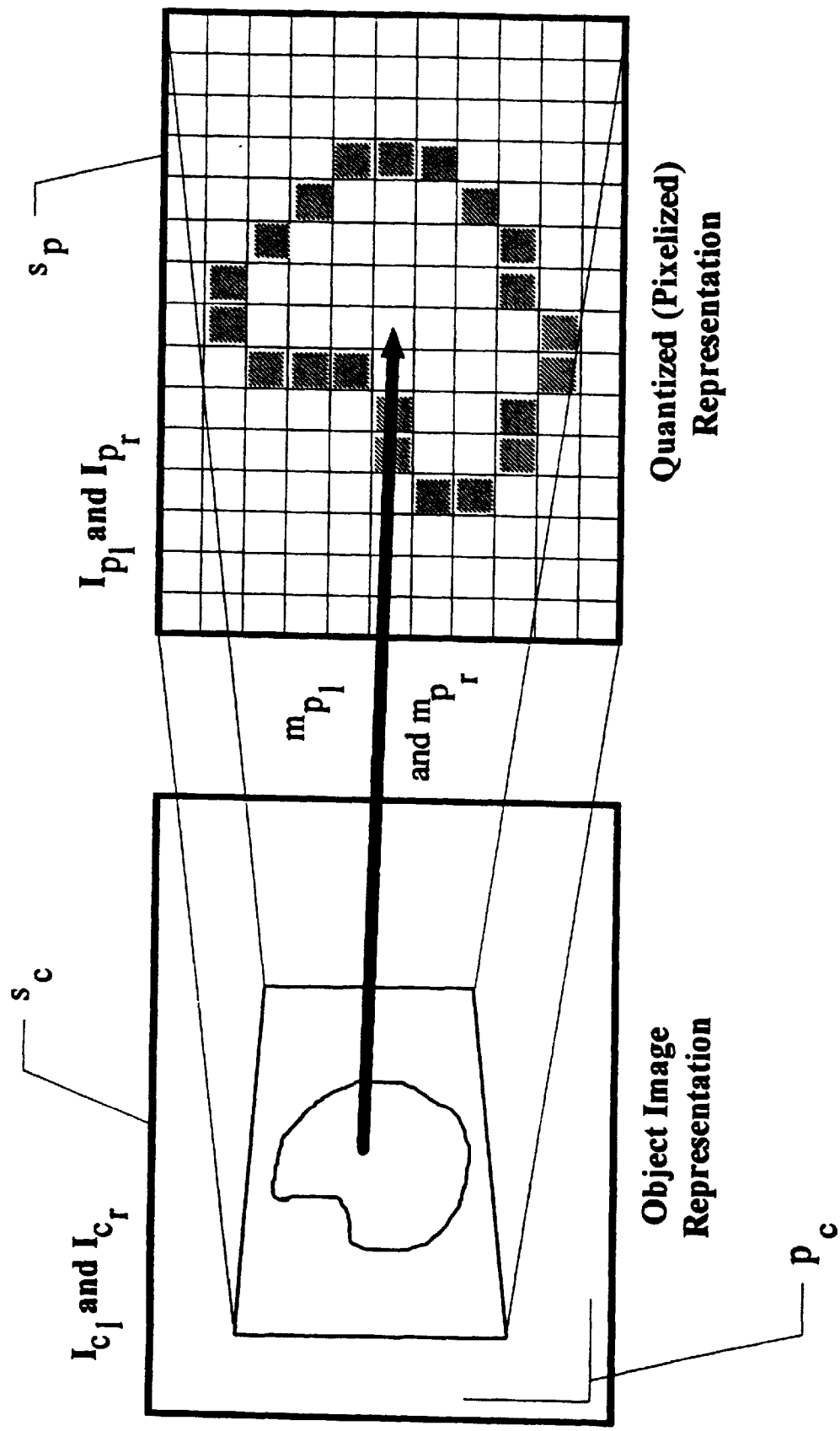
FIG. 4A is a schematic representation of the subprocess of mapping a projected perspective image geometrically represented on a continuous projection surface (Sc), to quantized perspective image represented as a pixelized image representation on a quantized projection surface (Sp), carried out within the stereoscopically-multiplexed image production subsystem of the present invention.

The right quantization mapping, mcpr, describes the conversion of the object image Icr, into a pixelized image Ipr, on the synthetic surface, spr. The image Ipr can be modified with the supplemental pixel information dr. In a similar manner, the left quantization mapping, mcpl, describes the conversion of the object image Icl, into a pixelized image Ipl, on the synthetic surface, spl. The image Ipl can be modified with the supplemental pixel information dl. The pixelized images Ipr and Ipl are represented by a 2-D array, where each element in the array represents a spatial pixel in the image and contains spectral data about the pixel. The quantization mappings, mcpr and mcpl, basically indicate how an arbitrary region of Icr and Icl (respectively) are mapped into the pixelized images Ipr and Ipl (as shown in FIG. 4a for a black and white spectral case).

As illustrated in FIG. 3A, the stereoscopic image multiplexing subsystem comprises the right and left multiplexing mappings (temporal, spatial, or spectral) mpsr and mpsl, the stereoscopic image surface ss, the right multiplexing image Isr, and left multiplexed image Isl, and the composite multiplexed image Is. The right multiplexing mapping mpsr defines the mapping of pixels in Ipr to pixels in Isr. Similarly, the left multiplexing mapping mpsl defines the mapping of pixels in Ipl to pixels in Isl. The images Isr and Isl represent the right and left eye stereoscopic perspectives of the object(s) M. Isr and Isl are formed by the mappings mpsr and mpsl in such a manor as to be compatible with the stereoscopic image-pair display subsystem. Is is formed from Isr and Isl as will be described later.

As illustrated in FIG. 3A, the stereoscopic image-pair display subsystem is comprised of the mapping msd, the display surface sd, the right stereoscopic display image Idr, the left stereoscopic display image Idl, and the composite stereoscopic display image Id, and the coordinate frame pd. The mapping msd defines the mappings of the pixels of Is onto the display pixels as represented by Id. The mapping msd can represent an optical projection subsystem, can be a one-to-one mapping, or can include some scaling factors between the image acquisition space RA and the image display space RB. The images Idr and Idl form a realistic stereoscopic display image-pair which, when viewed by the stereoscopic image-pair viewing subsystem, form a realistic representation, M', of the object(s) M. The virtual object M', is represented in the image display space, RB, which is referenced to coordinate frame pw. The display surface sd had imbedded coordinates pd which are referenced to the image display space coordinates pw by the transformation Twd.

As illustrated in FIG. 3A, the stereoscopic image-pair viewing subsystem is comprised of the right and left optical imaging mappings mder and mdel, the right viewing surface ser with imbedded coordinate system per, the left viewing surface sel with imbedded coordinate system pel, the right and left viewed images Ier and Iel, the viewing coordinate system pv, and the visual processing subsystem B. The right viewing image Ier is formed on the right viewing surface ser by the right optical imaging mapping mder. The left viewing image Iel is formed on the left viewing surface sel by the left optical imaging mapping mdel. The relationship between the right an left viewing surfaces and the viewing coordinate system, pv, is given by the transformations Tver and Tvel respectively. The relationship between the viewing coordinate system, pv, and the display surface coordinate system pd is given by the transformation Tdv. The transformations Tdv, Tver, and Tvel describe the position and orientation of the right and left viewing surfaces with respect to the display surface sd.

Figure 3B:
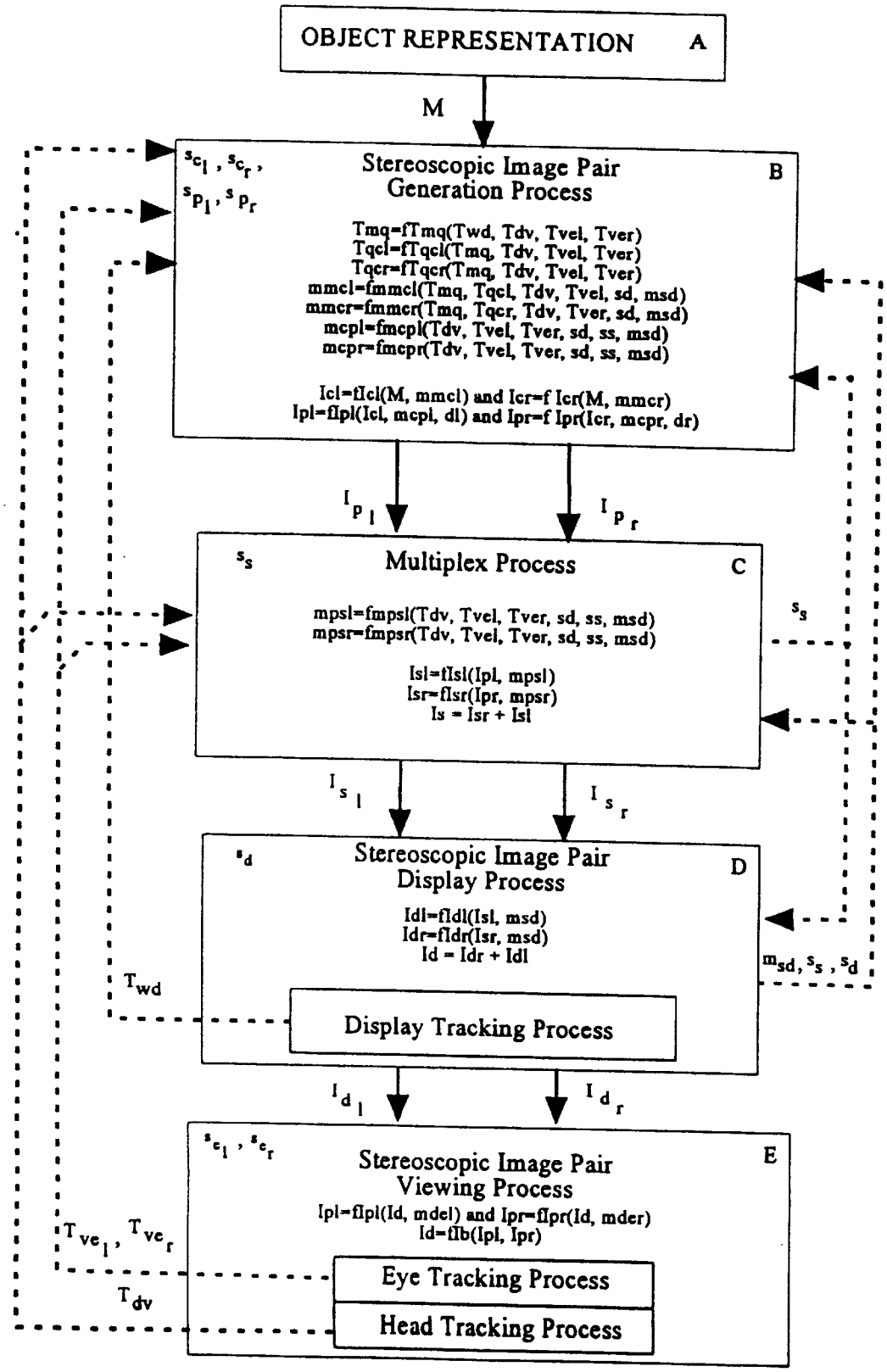
FIG. 3B is a schematic representation of the generalized stereoscopically-multiplexed image production, display and viewing process of FIG. 3A, setting forth the various projection and display surfaces, coordinate reference systems, transformations, mappings and parameters utilized by the particular subsystems at each stage of the process.

FIG. 3B shows the process steps to be carried out when computing the transformations and mappings to implement the system shown in FIG. 3A. As shown in FIG. 3B, the process comprises five process groups, labeled A through E, as identified as follows: the object representation process steps (A), the stereoscopic image-pair generation process steps (B), the stereoscopic image multiplexing process steps (C), the stereoscopic image-pair display process steps (D), and the stereoscopic image-pair viewing process steps (E).

The object representation process operates on an object representation of either a real physical object(s), Mr, or synthetic object representations, Ms. The synthetic object representations, Ms, can be represented in any convenient form such as the common geometric representations used in polygonal modeling systems (vertices, faces, edges, surfaces, and textures) or parametric function representations used in solids modeling systems (set of equations) which is well known in the art. The result of the object representation process steps is the creation of an object representation M which is further processed by the stereoscopic image-pair production process steps.

The stereoscopic image-pair generation process steps operate on the object representation, M and produces the right and left pixelized stereoscopic image-pairs Ipr and Ipl, respectively. The steps of the stereoscopic image-pair generation process use the transformations Tdv (acquired by the head position and orientation tracking subsystem), Tvel and Tver (acquired by the eye position and orientation tracking subsystem), and Twd (acquired by the display position and orientation tracking subsystem) and the acquisition of the display parameters msd, ss, and sd to compute various transformations and mappings as will be described next.

The transformation Tmq describes the position and orientation placement of the right and left stereoscopic image-pair acquisition surfaces scr and scl. Tmq is computed by the function fTmq which accepts as parameters Twd, Tdv, Tvel, Tver, and pm. fTmq computes Tmq such that the images Icr and Icl taken together form the beginnings of a stereoscopic image-pair which represents a portion of the object(s) M.

The transformation Tqcr describes the position and orientation placement of the right stereoscopic image-pair acquisition surface Icr with respect to pq. Tqcr is computed by the function fTqcr which accepts as parameters Tmq, Tdv, Tvel, and Tver. fTqcr computes Tqcr such that the image Icr from the surface scr forms the beginnings of a realistic stereoscopic image-pair. In a similar manor, the transformation Tqcl describes the position and orientation placement of the left stereoscopic image-pair acquisition surface Icl with respect to pq. Tqcl is computed by the function fTqcl which accepts as parameters Tmq, Tdv, Tvel, and Tver. fTqcl computes Tqcl such that the image Icl from the surface scl forms the beginnings of a realistic stereoscopic image-pair.

The right object mapping, mmcr, creates an image representation, Icr, of M, onto the surface scr. mmcr is computed by the function fmmcr which accepts as parameters Tmq, Tqcr, Tdv, Tver, sd, and msd. mmcr represents either a real optical imaging process in the case of a real object Mr or a synthetic rendering process (well known in the art) in the case of a synthetic object Ms. In a similar manor, the left object mapping, mmcl, creates an image representation, Icl, of M, onto the surface scl. mmcl is computed by the function fmmcl which accepts as parameters Tmq, Tqcl, Tdv, Tvel, sd, and msd. mmcl represents either a real optical imaging process in the case of a real object Mr or a synthetic rendering process (well known in the art) in the case of a synthetic object Ms.

The image representation Icr on surface scr is formed by the function fIcr which accepts as parameters mmcr and M.

In a similar manor, the image representation Icl on surface scl is formed by the function fIcl which accepts as parameters mmcl and M. Mappings mmcr and mmcl are defined in such a way that the images Icr and Icl taken together form the beginnings of a realistic right and left, respectively, stereoscopic image-pair which represents a portion of the object(s) M.

The right quantization mapping, mcpr, describes the conversion of the object image Icr, into a pixelized image Ipr, on the synthetic surface, spr. mcpr is computed by the function fmcpr which accepts as parameters Tdv, Tvel, Tver, sd, ss, and msd. The quantization mapping, mcpr indicates how an arbitrary region of Icr is mapped into the pixelized image Ipr. In a similar manor, the left quantization mapping, mcpl, describes the conversion of the object image Icl, into a pixelized image Ipl, on the synthetic surface, spl. mcpl is computed by the function fmcpl which accepts as parameters Tdv, Tvel, Tver, sd, ss, and msd. The quantization mapping, mcpl indicates how an arbitrary region of Icl is mapped into the pixelized image Ipl.

The right pixelized image Ipr on surface spr is formed by the function fIpr which accepts as parameters Icr, mcpr, and dr, where dr represents supplemental pixel information. In a similar manor, the left pixelized image Ipl on surface spl is formed by the function fIpl which accepts as parameters Icl, mcpl, and dl, where dl represents supplemental pixel information. Mappings mcpr and mcpl are defined in such a way that the resulting images Ipr and Ipl will lead to the creation of a realistic stereoscopic image-pair in later steps of this process. Mappings mcpr and mcpl can also be used to correct for limitations of an implemented system for performing the mappings mmcr and mmcl described above.

The stereoscopic image multiplexing process steps operate on the right and left pixelized images Ipr and Ipl respectively and produces the right and left multiplexed stereoscopic image representations Isl and Isr. The steps of the stereoscopic image-pair multiplexing process use the transformations Tdv (acquired by the head position and orientation tracking subsystem), and Tvel and Tver (acquired by the eye position and orientation tracking subsystem), and the acquisition of the display parameters msd, ss, and sd to compute various transformations and mappings as will be described next.

The right multiplexing mapping, mpsr, defines the mapping of pixels in Ipr to pixels in Isr. mpsr is computed by the function fmpsr which accepts as parameters Tdv, Tvel, Tver, sd, ss, and msd. In a similar manor, the left multiplexing mapping, mpsl, defines the mapping of pixels in Ipl to pixels in Isl. mpsl is computed by the function fmpsl which accepts as parameters Tdv, Tvel, Tver, sd, ss, and msd.

The right multiplexed image Isr, on surface ss, is formed by the function fIsr which accepts as parameters Ipr and mpsr. Likewise, the left multiplexed image Isl, on surface ss, is formed by the function fIsl which accepts as parameters Ipl and mpsl. Isr and Isl are formed by the mappings mpsr and mpsl in such a manor as to be compatible with the stereoscopic image-pair display subsystem. The composite multiplexed stereoscopic image, Is, is formed from the compositing of Isr and Isl.

The stereoscopic image-pair display process steps operate on the right and left stereoscopic images Isr and Isl, respectively, using the display mapping msd, to display the right and left stereoscopic image display pairs Idr and Idl. The mapping msd can be an electronics mapping to pixels on a display or projection optics to image onto a screen.

The right stereoscopic display image Idr, on surface sd, is formed by the function/process fIdr which accepts as parameters Isr and msd. Likewise, the left stereoscopic display image Idl, on surface sd, is formed by the function/process fIdl which accepts as parameters Isl and msd. The function/processes fIdr and fIdl form the stereoscopic encoding process which encodes the right and left stereoscopic display images, Idr and Idl in a form which can be viewed in a stereoscopic viewing mode by the stereoscopic image-pair viewing process or processes. The composite multiplexed stereoscopic display image, Id, is formed from the compositing of Idr and Idl.

The stereoscopic display surface, sd, has imbedded coordinates pd which are related to pw by the transformation Twd. The display position and orientation tracking process tracks the interaction of the display with the virtual environment M' and acquires the transformation Twd.

The stereoscopic image-pair viewing process steps represent the viewing decoding of the right and left stereoscopic display images, Idr and Idl, through the decoding mappings mder and mdel, respectively, to produce the right and left viewer images, Ier and Iel, respectively. The right and left viewer Images Ier and Iel, are formed on the right and left viewing surfaces ser and sel, respectively. The right viewing surface, ser, has imbedded coordinate frame per. Coordinate frame per is related to frame pv by the transformation Tver. Likewise, the left viewing surface, sel, has imbedded coordinate frame pel. Coordinate frame pel is related to frame pv by the transformation Tvel. The function/process fIpr accepts parameters Idr, and mder and performs the actual decoding of the image Idr to form the image Ier. Likewise, the function/process fIpl accepts parameters Idl, and mdel and performs the actual decoding of the image Idl to form the image Iel. The combination of images Ier and Iel in the visual processing center, B, forms the image Ib. Ib represents the perceived stereoscopic image M' as represented in the visual processing center B through the use of the function/process fIb.

Coordinate frame pv represents the imbedded coordinate frame of the combined right and left viewing surfaces ser and sel, respectively. pv is related to the stereoscopic image-pair display coordinates system, pd, by the transformation Tdv.

The head position and orientation tracking process tracks the interaction of the combined right and left viewing surfaces, ser and sel, with the display surface, sd, and acquires the transformation Tdv to describe this interaction. The eye position and orientation tracking process tracks the interaction of each individual right and left viewing surface, ser and sel, with respect to the coordinate frame pv, and acquires the right and left viewing surface transformations, Tver and Tvel.

The overall process steps set forth in the process groups A through E in FIG. 3B defines an interactive process which starts with the acquisition of the transformations Tdv (acquired by the head position and orientation tracking subsystem), Tvel and Tver (acquired by the eye position and orientation tracking subsystem), and Twd (acquired by the display position and orientation tracking subsystem) and the acquisition of the display parameters msd, ss, and sd. The interactive process continues with the process steps A, B, C, D, and E in the given order and then repeats with the acquisition of the above transformations and parameters.

Referring to FIGS. 2A, 4, 4B, 4C, the subsystem and generalized processes for producing stereoscopically-multiplexed images from stereoscopic image-pairs, will now be described.

Figure 4B:
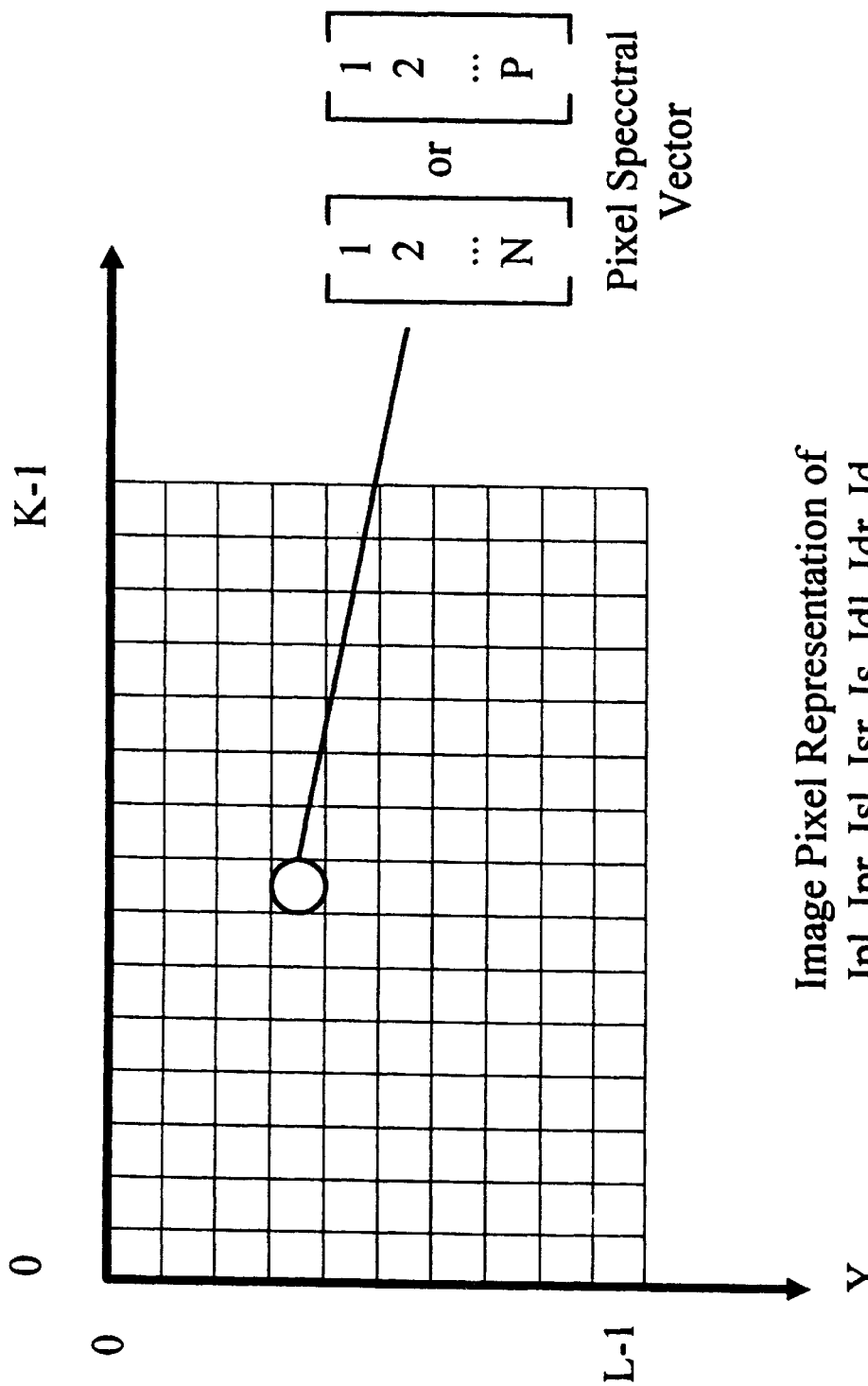
FIG. 4B is a schematic representation showing, in greater detail, the quantized perspective image mapped on quantized projection surface (Sp) in the form of a pixelized image representation, during the mapping subprocess of FIG. 4A.
Figure 4C:
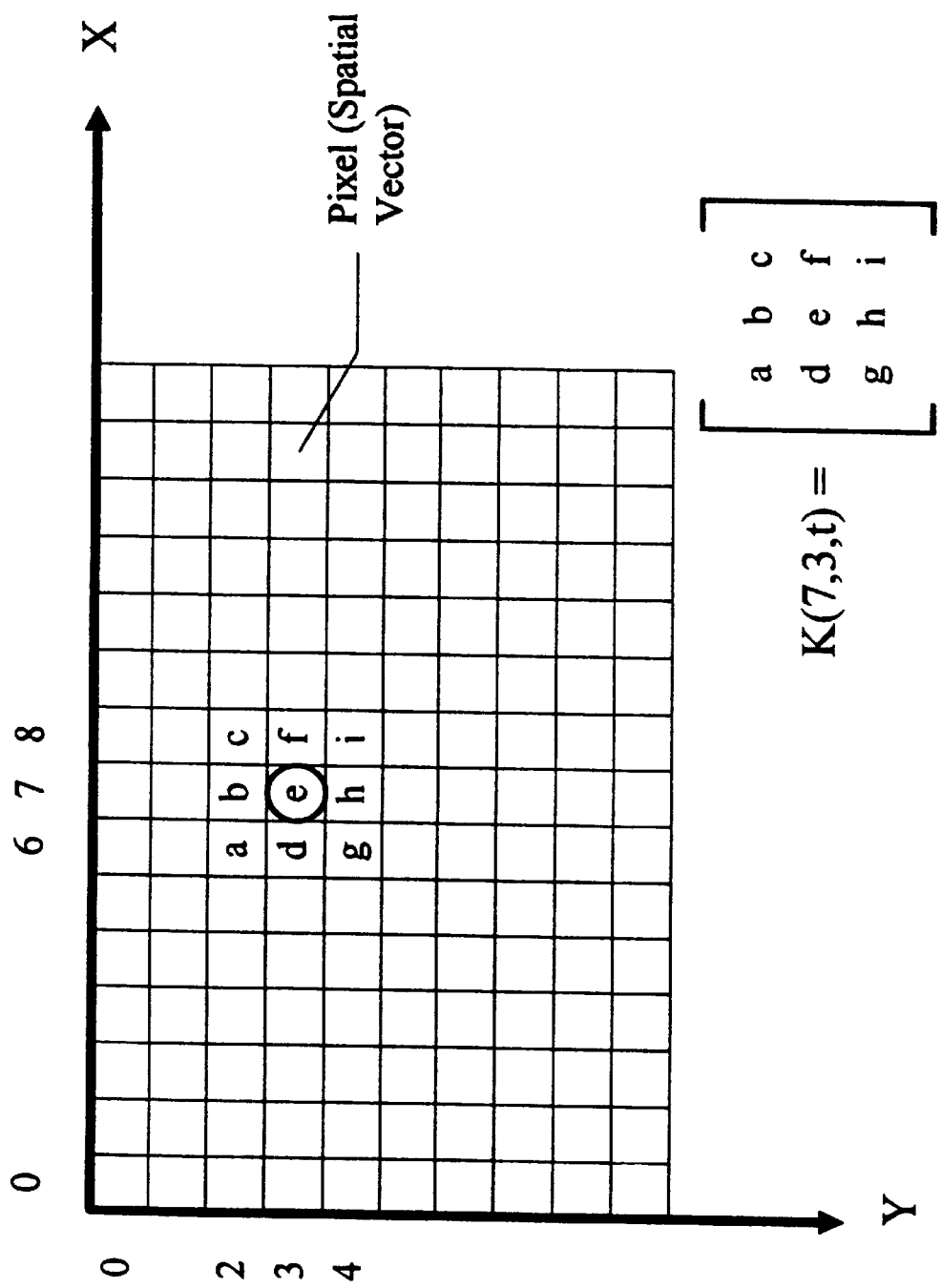
FIG. 4C is a schematic representation showing, in yet greater detail, the use of a kernel function during the stereoscopically-multiplexed image process of the present invention.

FIG. 4B shows the pixelized image representation for images Ipl, Ipr, Isl, Isr, Is, Idl, Idr, and Id. By definition, an image is a collection of (K horizontal by L vertical) pixels where each pixel block represents a spectral vector with N or P elements (N for images Ipl and Ipr and P for Isl and Isr). The elements of the spectral vector represent the spectral characteristics of the pixel in question (color, intensity, etc.). A typical representation would be a 3×1 vector representing the red, blue, and green components of the pixel. The pixels are indexed using an X,Y coordinate frame as shown in the figure. FIG. 4C shows show how the spatial kernel is applied to an image. A spatial kernel transforms a group of pixels in an input image into a single pixel in an output image. Each pixel in the output image (x,y) at a particular time (t) has a kernel K(x,y,t) associated with it. This kernel defines the weights of the neighboring pixels to combine to form the output image and is an N×N matrix where N is odd. The center element in the kernel matrix is the place holder and is used to define the relative position of the neighboring pixels based on the place holder pixel which represents x,y. In the example in FIG. 4C, element e is the place holder. Each element in the kernel matrix indicates a scaling weight for the corresponding pixel (this weight is applied to the spectral vector in that pixel location, v(x,y)). The pairing between the scaling weights and the pixel values is determined by the relative location to the place holder pixel. For example, the 3×3 kernel above is associated with the output pixel (7,3) so the element 'e' in the matrix defines the weight of the input pixel (7,3) and the neighboring elements in the kernel defines the 8 neighboring pixel weights based on their location in the matrix. If the spectral vectors are represented by vi(x,y,t) for the input image and vo(x,y,t) for the output image, then the output spectral vector vo(7,3,t) would be defined as follows (dropping the time dependence for ease of notation):

$$vio(7,3)=avi(6,2)+bvi(7,2)+cvi(8,2)+dvi(6,3)+evi(7,3)+$$
$$fvi(8,3)+gvi(6,4)+hvi(7,4)+ivi(8,4)$$

The quantized images, Ipl and Ipr, can be represented by a 2-D array of pixels, Ipl(x,y,t) and Ipr(x,y,t), where each x,y pixel entry represents a quantized area of the images Icl and Icr at quantized time t. The time value, t, in the Ipl and Ipr images, represents the time component of the image. The time value, image time, increments by 1 each time the Ipl and Ipr images change. Each image pixel is represented by a spectral vector, v(x,y,t), of size N×1 or P×1 (N for images Ipl and Ipr and P for Isl and Isr). A typical representation would be a 3×1 vector representing the red, blue, and green components of the pixel. Individual values in the intensity vector are represented as v(x,y,i) where i is the particular intensity element.

In essence, the general stereoscopically-multiplexed image process maps the pixels of Ipl into the pixels of Isl using the mapping mpsl and mapping the pixels of Ipr into the pixels of Isr using the mapping mpsr. The images Isl and Isr can be combined into the composite image Is or can be left separate. The general stereoscopically-multiplexed image process can be described by the following equations:

$$Isl(x,y,t)=Rl(x,y,t,Ipl(t))Kl(x,y,t)\{Ipl(t)\} \qquad 1.$$
$$Isr(x,y,t)=Rr(x,y,t,Ipr(t))Kr(x,y,t)\{Ipr(t)\} \qquad 2.$$
$$Is(x,y,t)=cl(t)Isl(x,y,t)+cr(t)Isr(x,y,t)$$

where

Isl(t) is the entire left output image from the multiplex operation at time t,

Isr(t) is the entire right output image from the multiplex operation at time t,

Rl is the spectral transform matrix which is a function of the pixel spectral vector in question (x,y) at time t. Rl is also a function of Ipl(t) which allows the transform to modify itself based on the spectral characteristics of the pixel or neighboring pixels. Typically only Ipl(x,y,t) would be used and not Ipl(t).

Rr is the spectral transform matrix which is a function of the pixel spectral vector in question (x,y) at time t. Rr is also a function of Ipr(t) which allows the transform to modify itself based on the spectral characteristics of the pixel or neighboring pixels. Typically only Ipr(x,y,t) would be used and not Ipr(t).

Kl is the spectral kernel operating on Ipl(t). Kl is a function of the current position in question (x,y) and the current time t.

Kr is the spectral kernel operating on Ipr(t). Kr is a function of the current position in question (x,y) and the current time t.

Ipl(t) is the entire Ipl image, Ipr(t) is the entire Ipr image.

Isl and Isr are the left and right multiplex output images, respectively.

Is is the composite of the two image Isl and Isr. This step is optional, some stereoscopic display systems can use a single stereoscopic image channel, Is, and others require separate left and right channels, Isl and Isr.

The operations represented by Equations 1 and 2 above are evaluated for each x,y pixel in Isl and Isr (this process can be performed in parallel for each pixel or for groups of pixels). The operations are performed in two steps. First, the spatial kernel Kl(x,y,t) is applied to the image Ipl(t) which forms a linear combination of the neighboring pixels of Ipl(x,y,t) to produce a spectral vector vl(x,y,t) at (x,y) at time t. Second, this spectral vector vl(x,y,t) is multiplied by the spectral transformation matrix, Rl(x,y,t,Ipl), to produce a modified spectral vector which is stored in Isl(x,y,t). This process is carried out for each pixel, (x,y), in Isl(t). The same process is carried out for each pixel in Isr(x,y,t). The resulting images, Isl(t) and Isr(t) can be composited into a single channel Is(t) by equation 3 above by a simple linear combination using weights cl(t) and cr(t) which are functions of time t. Typically, cl(t)=cr(t)=1. Advantageously, Equations 1, 2, and 3 can be evaluated in a massively parallel manner.

The spatial kernels, Kl and Kr, are N×N matrices where N is odd, and each entry in the matrix represents a linear weighting factor used to compute a new pixel value based on its neighbors (any number of them). A spatial kernel transforms a group of pixels in an input image into a single pixel in an output image. Each pixel in the output image (x,y) at a particular time (t) has a kernel K(x,y,t) associated with it. This kernel defines the weights of the neighboring pixels to combine to form the output image and is an N×N matrix where N is odd. The center element in the kernel matrix is the place holder and is used to define the relative position of the neighboring pixels based on the place holder pixel which represents x,y.

Notably, using massively parallel computers and a real-time electronically adapting micorpolarization panel 41, it is possible to achieve an adaptive encoding system which changes the micropolarization pattern (e.g. P1, P2, P1, P2, etc.) upon display surface 40, as required by the symmetries of the image at time (t).

Below are three examples of possible kernel functions that may be used with the system of the present invention to produce and display (1) spatially-multiplexed images (SMI) using a 1-D spatial modulation function, (2) temporallymultiplexed images, and (3) a SMI using a 2-D spatial modulation function. Each of these examples will be considered in their respective order below.

In the first SMI example, the kernel has the form:

$$Kl(x, y, t) = \begin{bmatrix} 0 & 0.5 & 0 \\ 0 & 0.5 & 0 \\ 0 & 0 & 0 \end{bmatrix} \text{ for } y \text{ odd}$$

$$Kl(x, y, t) = [0] \text{ for } y \text{ even}$$

This happens to be the left image Kernel for the 1-D spatial multiplexing format. Note that the above kernel is not a function of time and it therefor a spatial multiplexing technique. The center entry defines the pixel in question and the surrounding entries define the weights of the neighboring pixels to combine. Each corresponding pixel value is multiplied by the weighting value and the collection is summed. The result is the spectral vector for the Is image. In the above case, we are averaging the current pixel with the pixel above it on odd lines and doing nothing for even lines. The corresponding Kr for the SMI format is given below:

$$Kr(x, y, t) = \begin{bmatrix} 0 & 0 & 0 \\ 0 & 0.5 & 0 \\ 0 & 0.5 & 0 \end{bmatrix} \text{ for } y \text{ even}$$

$$Kr(x, y, t) = [0] \text{ for } y \text{ odd}$$

In the second example, the kernel functions for the field sequential (temporal multiplexing) technique are provided by the following expressions:

$$Kl(x,y,t)=[1] \text{ for } frac(t)<0.5$$

$$Kl(x,y,t)=[0] \text{ for } frac(t)>0.5$$

$$Kr(x,y,t)=[1] \text{ for } frac(t)>0.5$$

$$Kr(x,y,t)=[0] \text{ for } frac(t)<0.5$$

where, frac(t) returns the fractional portion of the time value t. These expressions state that left pixels are only "seen" for the first half of the time interval frac(t) and right pixels for the second half of the time interval frac(t).

The third example might be used when a pixel may be mapped into more than one pixel in the output image, as in a 2-D a checker board micropolarization pattern. An example kernel function, Kr, for a checkerboard polarization pattern might look like the following:

$$Kr(x, y, t) = [0] \text{ for } x \text{ even and } y \text{ odd}$$

$$Kr(x, y, t) = [0] \text{ for } x \text{ odd and } y \text{ even}$$

$$Kr(x, y, t) = \begin{bmatrix} 0 & 0 & 0 \\ 0 & 0.5 & 0.25 \\ 0 & 0.25 & 0 \end{bmatrix} \text{ for } x \text{ and } y \text{ odd}$$

$$Kr(x, y, t) = \begin{bmatrix} 0 & 0.25 & 0 \\ 0.25 & 0.5 & 0 \\ 0 & 0 & 0 \end{bmatrix} \text{ for } x \text{ and } y \text{ even}$$

Having described these types of possible kernels that may be used in the stereoscopic multiplexing process, attention is now turned to the spectral transformation matrices, Rl and Rr, which addresses the stereoscopic-multiplexing of the spectral components of left and right quantized perspective images.

The spectral transformation matrices, Rl and Rr, define a mapping of the spectral vectors produced by the kernel operation above to the spectral vectors in the output images, Isl and Isr. The spectral vector representation used by the input images, Ipl and Ipr, do not need to match the spectral vector representation used by the output images, Isl and Isr. For example, Ipl and Ipr could be rendered in full color and Isl and Isr could be generated in gray scale. The elements in the spectral vector could also be quantized to discrete levels. The spectral transformation matrices are a function of the x,y pixel in question at time t and also of the entire input image Ip. The parameterization of Rl and Rr on Ipl and Ipr (respectively) allows the spectral transformation to be a function of the color of the pixel (and optionally neighboring pixels) in question. By definition, a spectral transformation matrix is a P×N matrix where N is the number of elements in the spectral vectors of the input image and P is the number of elements in the spectral vectors of the output image. For example, if the input image had a 3×1 red, green, blue spectral vector and the output image was gray scale, 1×1 spectral vector, a spectral transform matrix which would convert the input image into a b/w image might look like, Rl(x,y,t)=[0.3 0.45 0.25] which forms the gray scale pixel by summing 0.3 times the red component, 0.45 times the green component, and 0.25 times the blue component. A color multiplexing system with a red, green, and blue 3×1 spectral vector might look like this:

$$Rl(x,y,t)=diag(1\ 0\ 1) \text{ for } frac(t)<0.5$$

$$Rl(x,y,t)=diag(0\ 1\ 0) \text{ for } frac(t)>0.5$$

$$Rr(x,y,t)=diag(0\ 1\ 0) \text{ for } frac(t)<0.5$$

$$Rr(x,y,t)=diag(1\ 0\ 1) \text{ for } frac(t)>0.5$$

Where diag(a,b,c) is the 3×3 diagonal matrix with diagonal elements a, b, c. A spectral transformation matrix to create a red/green anaglyph stereoscopic image could be:

$$Rl(x, y, t) = \begin{bmatrix} 0.3 & 0.45 & 0.25 \\ 0 & 0 & 0 \\ 0 & 0 & 0 \end{bmatrix} \text{ and } Rr(x, y, t) = \begin{bmatrix} 0 & 0 & 0 \\ 0.3 & 0.45 & 0.25 \\ 0 & 0 & 0 \end{bmatrix}$$

Note, in the above cases, when the spectral kernels are not specified they are assumed to be Kl=[1] and Kr=[1].

Figure 5A:
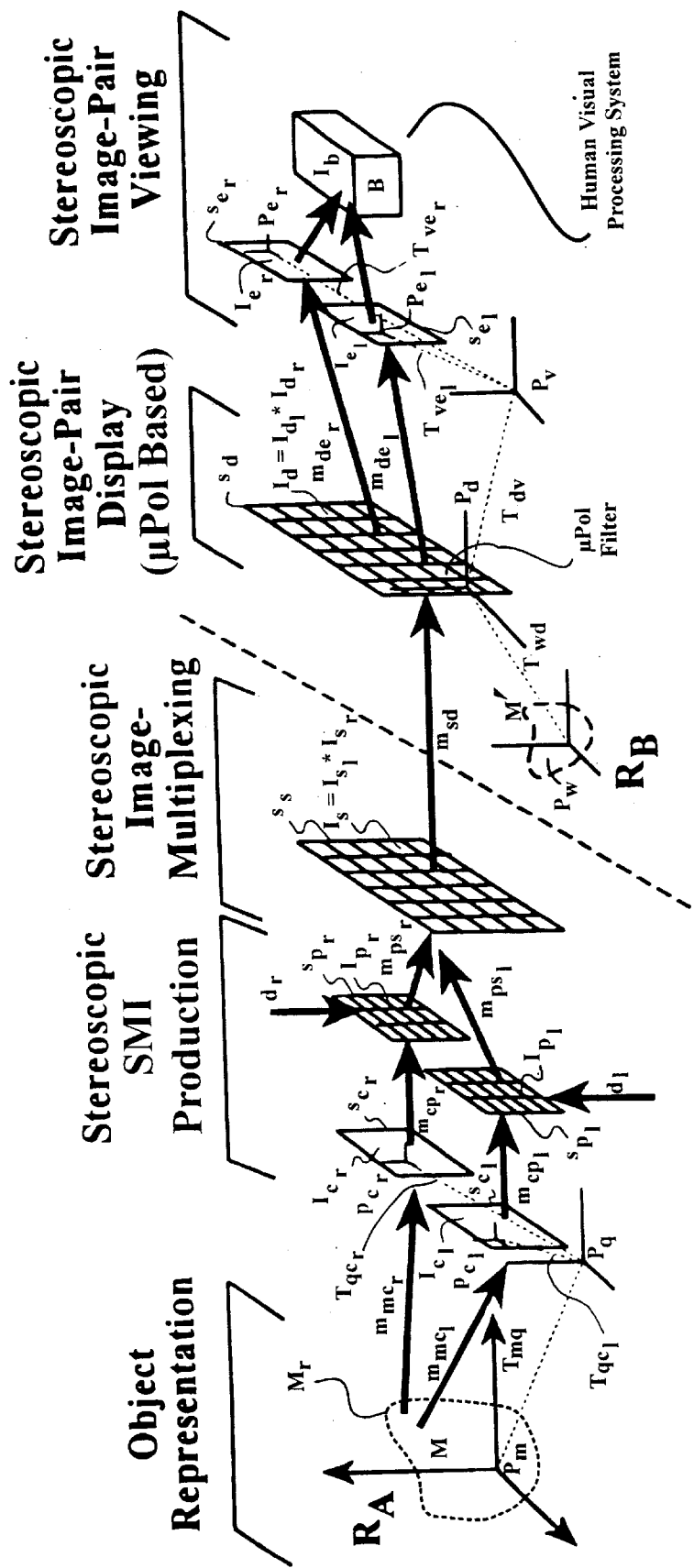
FIG. 5A is a schematic representation of the spatially-multiplexed image (SMI) production, display and viewing process of the present invention based on spatial-multiplexing principles, graphically illustrating the various projection and display surfaces, coordinate reference systems, transformations and mappings utilized in the process, wherein the 3-D object or scenery exists in virtual reality represented within the stereoscopically-multiplexed image generation subsystem of the present invention.

In FIG. 5A, there is shown another embodiment of the system hereof, which uses a novel spatial multiplexing technique and stereoscopic image pair generation system 7 viewing synthetic objects, Ms. As shown, the system is divided into five sub-systems, namely the object representation subsystem, the stereoscopic image-pair generation subsystem, the stereoscopic image multiplexing subsystem (using spatial multiplexing processes), the stereoscopic image-pair display subsystem based on the micro-polarizer technology, and the stereoscopic image-pair viewing subsystem based on polarization decoding techniques.

The object representation subsystem is comprises of dynamically changing or static object or objects, M, which are synthetic objects, Ms. These objects, M, are referenced to the coordinate frame pm in the image acquisition space RA.

The stereoscopic image-pair production subsystem is comprised of the right and left object surfaces scr and scl (with imbedded coordinate frames pcr and pcl), the right and left pixel surfaces spr and spl, the right and left object mappings mmcr and mmcl, the right and left quanitization mappings mcpr and mcpl, the coordinate frame pq, and the supplemental right and left pixel information dr and dl. Coordinate frame pq is referenced with respect to the coordinate frame pm by the transformation Tmq.

The right object mapping, mmcr, creates an image representation, Icr, of M, onto the surface scr. In a similar manner, the left object mapping, mmcl, creates an image representation, Icl, of M, onto the surface scl. Both surfaces scr and scl are referenced with respect to coordinate frame pq by transformations Tqcr and Tqcl, respectively. The object mappings mmcr and mmcl are virtual geometric mappings implemented with software or hardware. Images Icr and Icl (on surfaces scr and scl, respectively) are represented by geometric representations (hardware or software). The images Icr and Icl taken together form the beginnings of a stereoscopic image-pair which represent a portion of the virtual object(s) M. The transforms Tmq, Tqcr, and Tqcl and the mappings mmcr and mmcl are defined such that the resulting images Icr and Icl will lead to the creation of a realistic stereoscopic image-pair in later steps of this process.

The right quantization mapping, mcpr, describes the conversion of the object image Icr, into a pixelized image Ipr, on the synthetic surface, spr. The image Ipr can be modified with the supplemental pixel information dr. In a similar manner, the left quantization mapping, mcpl, describes the conversion of the object image Icl, into a pixelized image Ipl, on the synthetic surface, spl. The image Ipl can be modified with the supplemental pixel information dl. The pixelized images Ipr and Ipl are represented by a 2-D array, where each element in the array represents a spatial pixel in the image and contains spectral data about the pixel. The quantization mappings, mcpr and mcpl, indicate how an arbitrary region of Icr and Icl (respectively) are mapped into the pixelized images Ipr and Ipl.

The stereoscopic image multiplexing subsystem supports the right and left multiplexing mappings mpsr and mpsl, the stereoscopic image surface ss, the right multiplexing image Isr, and left multiplexed image Isl, and the composite multiplexed image Is. The right multiplexing mapping mpsr defines the spatial mapping of pixels in Ipr to pixels in Isr. Similarly, the left multiplexing mapping mpsl defines the spatial mapping of pixels in Ipl to pixels in Isl. The images Isr and Isl represent the right and left eye stereoscopic perspectives of the object(s) M. Isr and Isl are formed by the mappings mpsr and mpsl in such a manner as to be compatible with the micro-polarizer based stereoscopic image-pair display subsystem. Is is formed from Isr and Isl as will be described later.

The stereoscopic image-pair display subsystem supports the mapping msd, the display surface sd, the right stereoscopic spatial multiplexed display image Idr, the left stereoscopic spatial multiplexed display image Idl, and the composite stereoscopic spatial multiplexed display image Id, and the coordinate frame pd. The mapping nsd defines the mapping of the pixels of Is onto the display pixels as represented by Id. The mapping msd represents an optical projection subsystem and can include some scaling factors between the image acquisition space RA and the image display space RB. The images Idr and Idl form a realistic spatially multiplexed stereoscopic display image-pair which, when viewed by the stereoscopic image-pair viewing subsystem, form a realistic representation, M', of the object(s) M. The virtual object M', is represented in the image display space, RB, which is referenced to coordinate frame pw. The display surface sd, contains a micro-polarizer array which performs polarization encoding of the images Idr and Idl. Surface sd has imbedded coordinates pd which are referenced to the image display space coordinates pw by the transformation Twd.

The stereoscopic image-pair viewing subsystem supports the right and left optical imaging mappings mder and mdel, the right viewing surface ser with imbedded coordinate system per, the left viewing surface sel with imbedded coordinate system pel, the right and left viewed images Ier and Iel, the viewing coordinate system pv, and the visual processing subsystem B. The right viewing image Ier is formed on the right viewing surface ser by the right optical imaging mapping mder which performs a polarization decoding process. The left viewing image Iel is formed on the left viewing surface sel by the left optical imaging mapping mdel which performs a polarization decoding process. The relationship between the right an left viewing surfaces and the viewing coordinate system, pv, is given by the transformations Tver and Tvel respectively. The relationship between the viewing coordinate system, pv, and the display surface coordinate system pd is given by the transformation Tdv. The transformations Tdv, Tver, and Tvel describe the position and orientation of the right and left viewing surfaces with respect to the display surface sd.

Figure 5B:
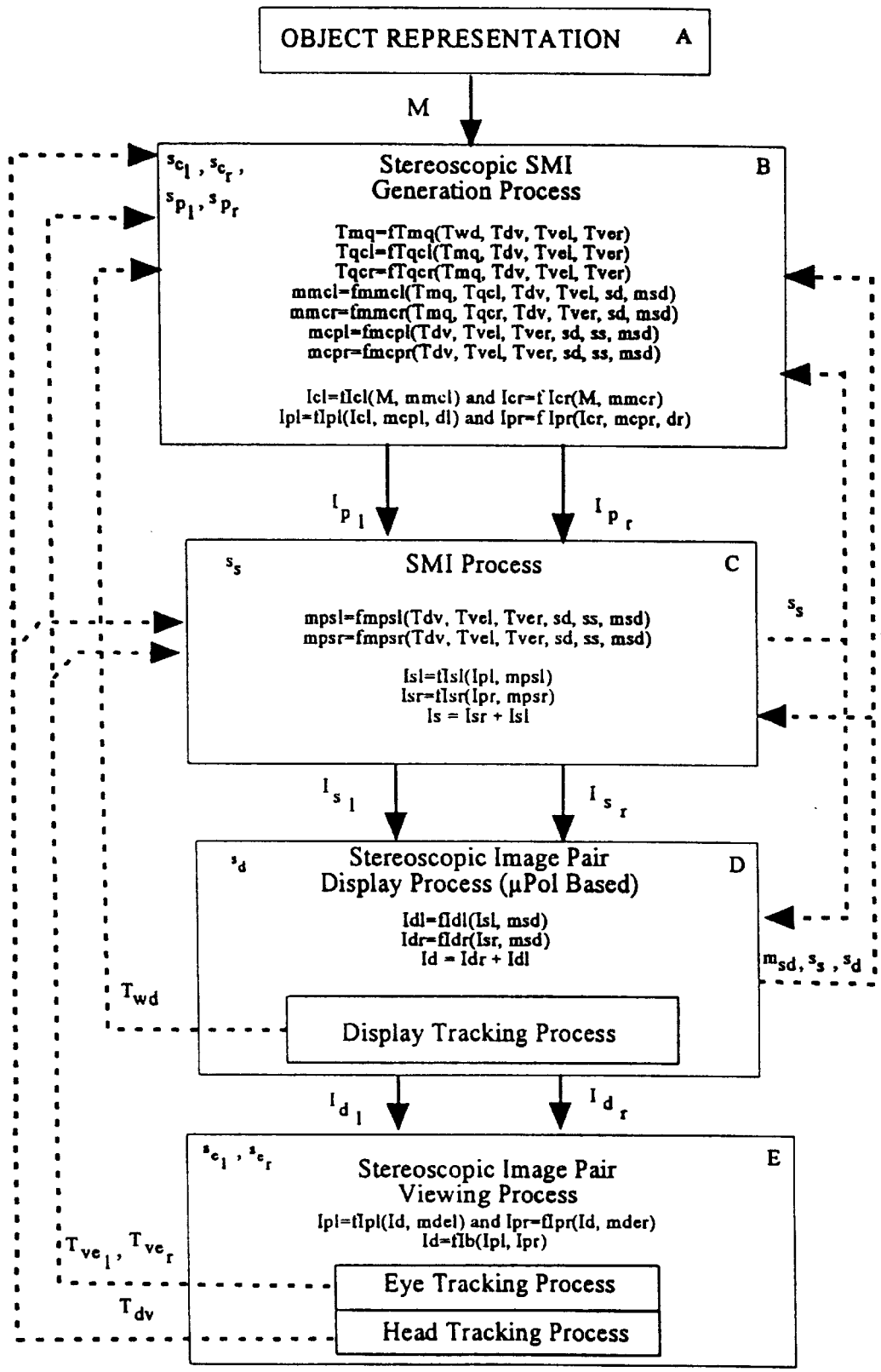
FIG. 5B is a schematic representation of the stereoscopically-multiplexed image production, display and viewing process of FIG. 5A, setting forth the various projection and display surfaces, coordinate reference systems, transformations, mappings and parameters utilized by the particular subsystems at each stage of the process.

FIG. 5B shows the process steps to be carried out when computing the transformations and mappings to implement the system shown in FIG. 5A. The process steps are organized into five process groups labeled A through E in FIG. 5B and are indicated by the object representation process steps (A); the stereoscopic image-pair generation process steps (B); the stereoscopic image multiplexing process steps (carried out using spatial multiplexing) (C); the stereoscopic image-pair display (micro-polarization filter based) process steps (D); and the stereoscopic image-pair viewing process steps (based on polarization decoding processes) (E).

The object representation process steps operate on an object representation of a synthetic object, Ms. The synthetic object representations, Ms, can be represented in any convenient form such as the common geometric representations used in polygonal modeling systems (vertices, faces, edges, surfaces, and textures) or parametric function representations used in solids modeling systems (set of equations) which is well known in the art. The result of the object representation process steps is the creation of an object representation M which is further processed by the stereoscopic image-pair generation process steps.

The stereoscopic image-pair generation process steps operate on the object representation, M and produces the right and left pixelized stereoscopic image-pairs Ipr and Ipl, respectively. The steps of the stereoscopic image-pair generation process use the transformations Tdv (acquired by the head position and orientation tracking subsystem), Tvel and Tver (acquired by the eye position and orientation tracking subsystem), and Twd (acquired by the display position and orientation tracking subsystem) and the acquisition of the display parameters msd, ss, and sd to compute various transformations and mappings as will be described next.

The transformation Tmq describes the position and orientation placement of the right and left stereoscopic image-pair generation surfaces scr and scl. Tmq is computed by the function fTmq which accepts as parameters Twd, Tdv, Tvel, Tver, and pm. fTmq computes Tmq such that the images Icr and Icl taken together form the beginnings of a stereoscopic image-pair which represents a portion of the object(s) M.

The transformation Tqcr describes the position and orientation placement of the right stereoscopic image-pair acquisition surface Icr with respect to pq. Tqcr is computed by the function fTqcr which accepts as parameters Tmq, Tdv, Tvel, and Tver. fTqcr computes Tqcr such that the image Icr from the surface scr forms the beginnings of a realistic stereoscopic image-pair. In a similar manor, the transformation Tqcl describes the position and orientation placement of the left stereoscopic image-pair acquisition surface Icl with respect to pq. Tqcl is computed by the function fTqcl which accepts as parameters Tmq, Tdv, Tvel, and Tver. fTqcl computes Tqcl such that the image Icl from the surface scl forms the beginnings of a realistic stereoscopic image-pair.

The right object mapping, mmcr, creates an image representation, Icr, of M, onto the surface scr. mmcr is computed by the function fmmcr which accepts as parameters Tmq, Tqcr, Tdv, Tver, sd, and msd. mmcr represents a synthetic rendering process (well known in the art). In a similar manner, the left object mapping, mmcl, creates an image representation, Icl, of M, onto the surface scl. mmcl is computed by the function fmmcl which accepts as parameters Tmq, Tqcl, Tdv, Tvel, sd, and msd. mmcl represents a geometric rendering process (well known in the art).

The image representation Icr on surface scr is formed by the function fIcr which accepts as parameters mmcr and M. In a similar manner, the image representation Icl on surface scl is formed by the function fIcl which accepts as parameters mmcl and M. Mappings mmcr and mmcl are defined in such a way that the images Icr and Icl taken together form the beginnings of a realistic right and left, respectively, stereoscopic image-pair which represents a portion of the object(s) M.

The right quantization mapping, mcpr, describes the conversion of the object image Icr, into a pixelized image Ipr, on the synthetic surface, spr. mcpr is computed by the function fmcpr which accepts as parameters Tdv, Tvel, Tver, sd, ss, and msd. The quantization mapping, mcpr indicates how an arbitrary region of Icr is mapped into the pixelized image Ipr. In a similar manner, the left quantization mapping, mcpl, describes the conversion of the object image Icl, into a pixelized image Ipl, on the synthetic surface, spl. mcpl is computed by the function fmcpl which accepts as parameters Tdv, Tvel, Tver, sd, ss, and msd. The quantization mapping, mcpl indicates how an arbitrary region of Icl is mapped into the pixelized image Ipr.

The right pixelized image Ipr on surface spr is formed by the function fIpr which accepts as parameters Icr, mcpr, and dr, where dr represents supplemental pixel information. In a similar manor, the left pixelized image Ipl on surface spl is formed by the function fIpl which accepts as parameters Icl, mcpl, and dl, where dl represents supplemental pixel information. Mappings mcpr and mcpl are defined in such a way that the resulting images Ipr and Ipl will lead to the creation of a realistic stereoscopic image-pair in later steps of this process. Mappings mcpr and mcpl can also be used to correct for limitations of an implemented system for performing the mappings mmcr and mmcl described above.

The stereoscopic image spatial multiplexing process steps operate on the right and left pixelized images Ipr and Ipl respectively and produces the right and left spatially multiplexed stereoscopic image representations Isr and Isl. The steps of the stereoscopic image-pair spatial multiplexing process use the transformations Tdv (acquired by the head position and orientation tracking subsystem), and Tvel and Tver (acquired by the eye position and orientation tracking subsystem), and the acquisition of the display parameters msd, ss, and sd to compute various transformations and mappings as will be described next.

The right multiplexing mapping, mpsr, defines the mapping of pixels in Ipr to pixels in Isr. mpsr is computed by the function fmpsr which accepts as parameters Tdv, Tvel, Tver, sd, ss, and msd. In a similar manner, the left multiplexing mapping, mpsl, defines the mapping of pixels in Ipl to pixels in Isl. mpsl is computed by the function fmpsl which accepts as parameters Tdv, Tvel, Tver, sd, ss, and msd.

The right multiplexed image Isr, on surface ss, is formed by the function fIsr which accepts as parameters Ipr and mpsr. Likewise, the left multiplexed image Isl, on surface ss, is formed by the function fIsl which accepts as parameters Ipl and mpsl. Isr and Isl are formed by the mappings mpsr and mpsl to be compatible with the micro-polarizing filter based stereoscopic image-pair display subsystem. The composite multiplexed stereoscopic image, Is, is formed from the compositing of Isr and Isl.

The stereoscopic image-pair display process steps operate on the right and left stereoscopic images Isr and Isl, respectively, using the display mapping msd, to display the right and left stereoscopic image display pairs Idr and Idl on the micro-polarizer based display surface, sd. The mapping msd represent projection optics.

The right stereoscopic display image Idr, on surface sd, is formed by the function/process fIdr which accepts as parameters Isr and msd. Likewise, the left stereoscopic display image Idl, on surface sd, is formed by the function/process fIdl which accepts as parameters Isl and msd. The function/processes fIdr and fIdl form the stereoscopic encoding process which encodes the right and left stereoscopic display images, Idr and Idl, using polarized light (via the application of a micro-polarizer to the display surface sd) so at to be viewed in a stereoscopic viewing mode by the stereoscopic image-pair viewing process or processes. The composite multiplexed stereoscopic display image, Id, is formed from the compositing of Idr and Idl.

The stereoscopic display surface, sd, has imbedded coordinates pd which are related to pw by the transformation Twd. The display position and orientation tracking process tracks the interaction of the display with the virtual environment M' and acquires the transformation Twd.

The stereoscopic image-pair viewing process steps represent the viewing decoding of the right and left stereoscopic display images, Idr and Idl, through the decoding mappings mder and mdel, respectively, to produce the right and left viewer images, Ier and Iel, respectively. The right and left viewer Images Ier and Iel are formed on the right and left viewing surfaces ser and sel, respectively. The right viewing surface, ser, has imbedded coordinate frame per. Coordinate frame per is related to frame pv by the transformation Tver. Likewise, the left viewing surface, sel, has imbedded coordinate frame pel. Coordinate frame pel is related to frame pv by the transformation Tvel. The function/process fIpr accepts parameters Idr and mder and performs the actual decoding of the image Idr to form the image Ier using a polarizing filter decoder. Likewise, the function/process fIpl accepts parameters Idl and mdel and performs the actual decoding of the image Idl to form the image Iel using a polarizing filter decoder. The combination of images Ier and Iel in the visual processing center, B, forms the image Ib. Ib represents the perceived stereoscopic image M' as represented in the visual processing center B through the use of the function/process fIb.

Coordinate frame pv represents the imbedded coordinate frame of the combined right and left viewing surfaces ser and sel, respectively. pv is related to the stereoscopic image-pair display coordinates system, pd, by the transformation Tdv.

The head position and orientation tracking process tracks the interaction of the combined right and left viewing surfaces, ser and sel, with the display surface, sd, and acquires the transformation Tdv to describe this interaction. The eye position and orientation tracking process tracks the interaction of each individual right and left viewing surface, ser and sel, with respect to the coordinate frame pv, and acquires the right and left viewing surface transformations, Tver and Tvel.

The overall process steps defined by the process groups A through E in FIG. 5B illustrate an interactive process which starts with the acquisition of the transformations Tdv (acquired by the head position and orientation tracking subsystem), Tvel and Tver (acquired by the eye position and orientation tracking subsystem), and Twd (acquired by the display position and orientation tracking subsystem) and the acquisition of the display parameters msd, ss, and sd. The interactive process continues with the process steps A, B, C, D, and E in the given order and then repeats with the acquisition of the above transformations and parameters.

Figure 6A:
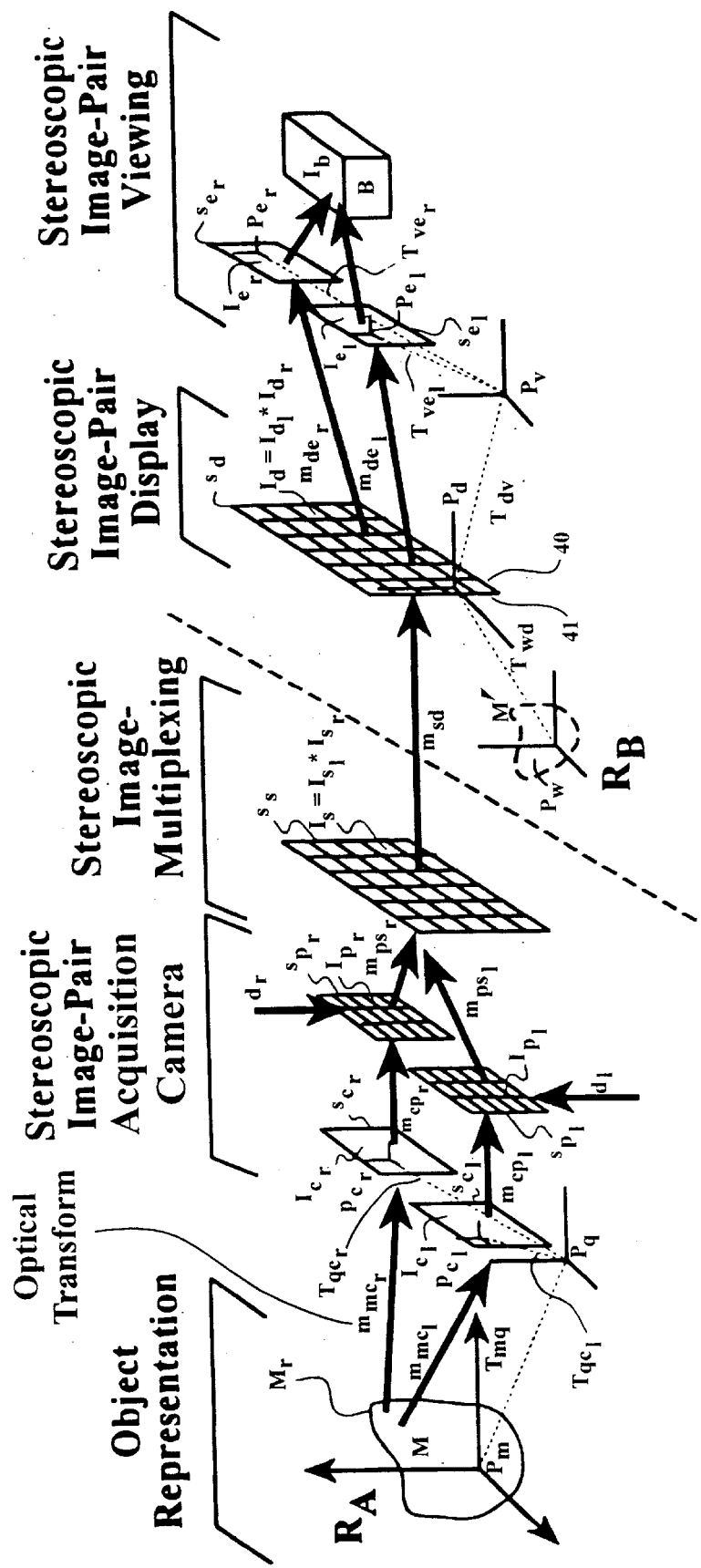
FIG. 6A is a schematic representation of the spatially-multiplexed image (SMI) production, display and viewing process of the present invention, graphically illustrating the various projection and display surfaces, coordinate reference systems, transformations and mappings utilized in the process, wherein the 3-D object or scenery exists in physical reality.

FIG. 6A shows another embodiment the system of the present invention spatial-multiplexing technique, and stereoscopic image-pair acquisition system 8 to capture information about real object, Mr. As shown, the system involves five sub-systems, namely the object representation subsystem, the stereoscopic image-pair acquisition subsystem, the stereoscopic multiplexing image subsystem (using spatial-multiplexing processes), the stereoscopic image-pair display subsystem 6, and the stereoscopic image-pair viewing subsystem based on polarization decoding techniques.

In this embodiment, images are dynamically changing or static object or objects, M, composed of real objects, Mr, are imaged by subsystem 8. These objects, M, are referenced to the coordinate frame pm in the image acquisition space RA.

The stereoscopic image-pair acquisition subsystem supports the right and left object surfaces scr and scl (with imbedded coordinate frames pcr and pcl), the right and left pixel surfaces spr and spl, the right and left object mappings mmcr and mmcl, the right and left quanitization mappings mcpr and mcpl, the coordinate frame pq, and the supplemental right and left pixel information dr and dl. Coordinate frame pq is referenced with respect to the coordinate frame pm by the transformation Tmq.

The right object mapping, mmcr, creates an image representation, Icr, of M, onto the surface scr. In a similar manner, the left object mapping, mmcl, creates an image representation, Icl, of M, onto the surface scl. Both surfaces scr and scl are referenced with respect to coordinate frame pq by transformations Tqcr and Tqcl, respectively. The object mappings mmcr and mmcl are optical imaging processes. Images Icr and Icl (on surfaces scr and scl, respectively) are represented by physical optical images. The images Icr and Icl taken together form the beginnings of a stereoscopic image-pair which represent a portion of the virtual object(s) M. The transforms Tmq, Tqcr, and Tqcl and the mappings mmcr and mmcl are defined such that the resulting images Icr and Icl will lead to the creation of a realistic stereoscopic image-pair in later steps of this process.

The right quantization mapping, mcpr, describes the conversion of the object image Icr, into a pixelized image Ipr, on the synthetic surface, spr. The image Ipr can be modified with the supplemental pixel information dr. In a similar manner, the left quantization mapping, mcpl, describes the conversion of the object image Icl, into a pixelized image Ipl, on the synthetic surface, spl. The image Ipl can be modified with the supplemental pixel information dl. The pixelized images Ipr and Ipl are represented by a 2-D array, where each element in the array represents a spatial pixel in the image and contains spectral data about the pixel. The quantization mappings, mcpr and mcpl, indicate how an arbitrary region of Icr and Icl (respectively) are mapped into the pixelized images Ipr and Ipl.

The stereoscopic image multiplexing subsystem supports the right and left multiplexing mappings mpsr and mpsl, the stereoscopic image surface ss, the right multiplexing image Isr, and left multiplexed image Isl, and the composite multiplexed image Is. The right multiplexing mapping mpsr defines the spatial mapping of pixels in Ipr to pixels in Isr. Similarly, the left multiplexing mapping mpsl defines the spatial mapping of pixels in Ipl to pixels in Isl. The images Isr and Isl represent the right and left eye stereoscopic perspectives of the object(s) M. Isr and Isl are formed by the mappings mpsr and mpsl in such a manner as to be compatible with the micro-polarizer based stereoscopic image-pair display subsystem. Is is formed from Isr and Isl as will be described later.

The stereoscopic image-pair display subsystem supports the mapping msd, the display surface sd, the right stereoscopic spatial multiplexed display image Idr, the left stereoscopic spatial multiplexed display image Idl, and the composite stereoscopic spatial multiplexed display image Id, and the coordinate frame pd. The mapping msd defines the mappings of the pixels of Is onto the display pixels as represented by Id. The mapping msd represents an optical projection subsystem and can include some scaling factors between the image acquisition space RA and the image display space RB. The images Idr and Idl form a realistic spatially multiplexed stereoscopic display image-pair which, when viewed by the stereoscopic image-pair viewing subsystem, form a realistic representation, M', of the object(s) M. The virtual object M', is represented in the image display space, RB, which is referenced to coordinate frame pw. The display surface sd, contains a micro-polarizer array which performs polarization encoding of the images Idr and Idl. Surface sd has imbedded coordinates pd which are referenced to the image display space coordinates pw by the transformation Twd.

The stereoscopic image-pair viewing subsystem supports the right and left optical imaging mappings mder and mdel, the right viewing surface ser with imbedded coordinate system per, the left viewing surface sel with imbedded coordinate system pel, the right and left viewed images Ier and Iel, the viewing coordinate system pv, and the visual processing subsystem B. The right viewing image Ier is formed on the right viewing surface ser by the right optical imaging mapping mder which performs a polarization decoding process. The left viewing image Iel is formed on the left viewing surface sel by the left optical imaging mapping mdel which performs a polarization decoding process. The relationship between the right an left viewing surfaces and the viewing coordinate system, pv, is given by the transformations Tver and Tvel respectively. The relationship between the viewing coordinate system, pv, and the display surface coordinate system pd is given by the transformation Tdv. The transformations Tdv, Tver, and Tvel describe the position and orientation of the right and left viewing surfaces with respect to the display surface sd.

Figure 6B:
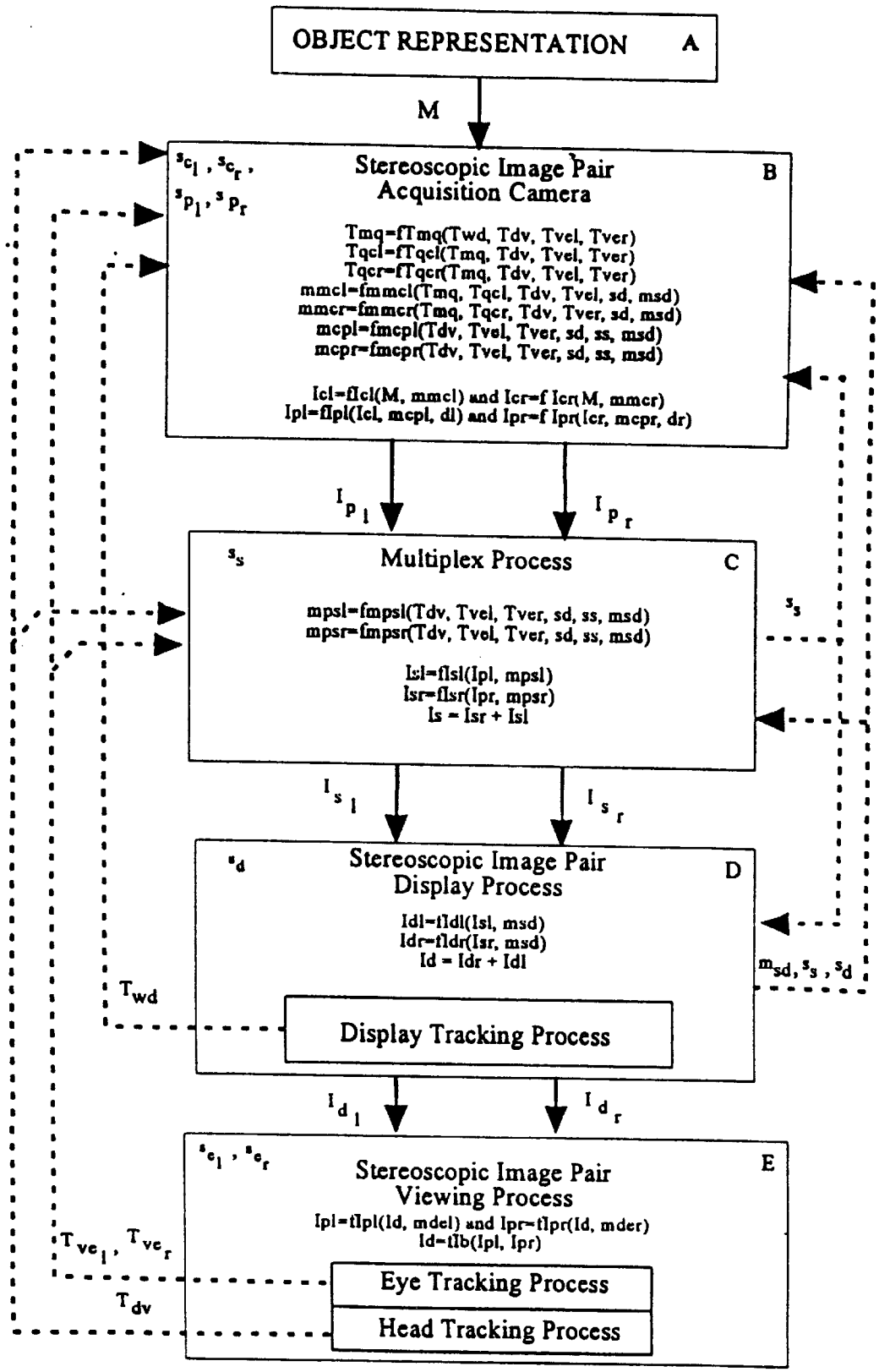
FIG. 6B is a schematic representation of the spatially-multiplexed image production, display and viewing process of FIG. 6A, setting forth the various projection and display surfaces, coordinate reference systems, transformations, mappings and parameters utilized by the particular subsystems at each stage of the process.

FIG. 6B shows the process steps to be carried out when computing the transformations and mappings to implement the system shown in FIG. 6A. The process steps are organized into five process groups, labeled A through E in FIG. 3b and are indicated by the object representation process steps (A), the stereoscopic image-pair acquisition process steps (B), the stereoscopic image multiplexing process steps (carried out using spatial multiplexing) (C), the stereoscopic image-pair display (micro-polarization filter based) process steps (D), and the stereoscopic image-pair viewing process steps (based on polarization decoding processes) (E).

The object representation process steps operate on real physical object, Mr. The result of the object representation process steps is the creation of an object representation M which is further processed by the stereoscopic image-pair acquisition process steps.

The stereoscopic image-pair generation process steps operate on the object representation, M and produce the right and left pixelized stereoscopic image-pairs Ipr and Ipl, respectively. The steps of the stereoscopic image-pair generation process use the transformations Tdv (acquired by the head position and orientation tracking subsystem), Tvel and Tver (acquired by the eye position and orientation tracking subsystem), and Twd (acquired by the display position and orientation tracking subsystem) and the acquisition of the display parameters msd, ss, and sd to compute various transformations and mappings as will be described next.

The transformation Tmq describes the position and orientation placement of the right and left stereoscopic image-pair acquisition surfaces scr and scl. Tmq is computed by the function fTmq which accepts as parameters Twd, Tdv, Tvel, Tver, and pm. fTmq computes Tmq such that the images Icr and Icl taken together form the beginnings of a stereoscopic image-pair which represent a portion of the object(s) M.

The transformation Tqcr describes the position and orientation placement of the right stereoscopic image-pair acquisition surface Icr with respect to pq. Tqcr is computed by the function fTqcr which accepts as parameters Tmq, Tdv, Tvel, and Tver. fTqcr computes Tqcr such that the image Icr from the surface scr forms the beginnings of a realistic stereoscopic image-pair. In a similar manner, the transformation Tqcl describes the position and orientation placement of the left stereoscopic image-pair acquisition surface Icl with respect to pq. Tqcl is computed by the function fTqcl which accepts as parameters Tmq, Tdv, Tvel, and Tver. fTqcl computes Tqcl such that the image Icl from the surface scl forms the beginnings of a realistic stereoscopic image-pair.

The right object mapping, mmcr, creates an image representation, Icr, of M, onto the surface scr. mmcr is computed by the function fmmcr which accepts as parameters Tmq, Tqcr, Tdv, Tver, sd, and msd. mmcr represents an optical imaging process (well known in the art). In a similar manner, the left object mapping, mmcl, creates an image representation, Icl, of M, onto the surface scl. mmcl is computed by the function fmmcl which accepts as parameters Tmq, Tqcl, Tdv, Tvel, sd, and msd. mmcl represents an optical imaging process (well known in the art).

The image representation Icr on surface scr is formed by the function fIcr which accepts as parameters mmcr and M. In a similar manner, the image representation Icl on surface scl is formed by the function fIcl which accepts as parameters mmcl and M. Mappings mmcr and mmcl are defined in such a way that the images Icr and Icl taken together form the beginnings of a realistic right and left, respectively, stereoscopic image-pair which represents a portion of the object(s) M.

The right quantization mapping, mcpr, describes the conversion of the object image Icr, into a pixelized image Ipr, on the synthetic surface, spr. mcpr is computed by the function fmcpr which accepts as parameters Tdv, Tvel, Tver, sd, ss, and msd. The quantization mapping, mcpr indicates how an arbitrary region of Icr is mapped into the pixelized image Ipr. In a similar manner, the left quantization mapping, mcpl, describes the conversion of the object image Icl, into a pixelized image Ipl, on the synthetic surface, spl. mcpl is computed by the function fmcpl which accepts as parameters Tdv, Tvel, Tver, sd, ss, and msd. The quantization mapping, mcpl indicates how an arbitrary region of Icl is mapped into the pixelized image Ipr.

The right pixelized image Ipr on surface spr is formed by the function fIpr which accepts as parameters Icr, mcpr, and dr, where dr represents supplemental pixel information. In a similar manor, the left pixelized image Ipl on surface spl is formed by the function fIpl which accepts as parameters Icl, mcpl, and dl, where dl represents supplemental pixel information. Mappings mcpr and mcpl are defined in such a way that the resulting images Ipr and Ipl will lead to the creation of a realistic stereoscopic image-pair in later steps of this process. Mappings mcpr and mcpl can also be used to correct for limitations of an implemented system for performing the mappings mmcr and mmcl described above.

The stereoscopic image spatial multiplexing process steps operate on the right and left pixelized images Ipr and Ipl respectively and produces the right and left spatially multiplexed stereoscopic image representations Isr and Isl. The steps of the stereoscopic image-pair spatial multiplexing process use the transformations Tdv (acquired by the head position and orientation tracking subsystem), and Tvel and Tver (acquired by the eye position and orientation tracking subsystem), and the acquisition of the display parameters msd, ss, and sd to compute various transformations and mappings as will be described next.

The right multiplexing mapping, mpsr, defines the mapping of pixels in Ipr to pixels in Isr. mpsr is computed by the function fmpsr which accepts as parameters Tdv, Tvel, Tver, sd, ss, and msd. In a similar manner, the left multiplexing mapping, mpsl, defines the mapping of pixels in Ipl to pixels in Isl. mpsl is computed by the function fmpsl which accepts as parameters Tdv, Tvel, Tver, sd, ss, and msd.

The right multiplexed image Isr, on surface ss, is formed by the function fIsr which accepts as parameters Ipr and mpsr. Likewise, the left multiplexed image Isl, on surface ss, is formed by the function fIsl which accepts as parameters Ipl and mpsl. Isr and Isl are formed by the mappings mpsr and mpsl to be compatible with the micro-polarizing filter based stereoscopic image-pair display subsystem. The composite multiplexed stereoscopic image, Is, is formed from the compositing of Isr and Isl.

The stereoscopic image-pair display process steps operate on the right and left stereoscopic images Isr and Isl, respectively, using the display mapping msd, to display the right and left stereoscopic image display pairs Idr and Idl on the micro-polarizer based display surface, sd. The mapping msd represent projection optics.

The right stereoscopic display image Idr, on surface sd, is formed by the function/process fIdr which accepts as parameters Isr and msd. Likewise, the left stereoscopic display image Idl, on surface sd, is formed by the function/process fIdl which accepts as parameters Isl and msd. The function/processes fIdr and fIdl form the stereoscopic encoding process which encodes the right and left stereoscopic display images, Idr and Idl, using polarized light (via the application of a micro-polarization panel 41 to the display surface sd) so as to be viewed in a stereoscopic viewing mode by the stereoscopic image-pair viewing process or processes. The composite multiplexed stereoscopic display image, Id, is formed from the compositing of Idr and Idl.

The stereoscopic display surface, sd, has imbedded coordinates pd which are related to pw by the transformation Twd. The display position and orientation tracking process tracks the interaction of the display with the virtual environment M' and acquires the transformation Twd.

The stereoscopic image-pair viewing process steps represent the viewing decoding of the right and left stereoscopic display images, Idr and Idl, through the decoding mappings mder and mdel, respectively, to produce the right and left viewer images, Ier and Iel, respectively. The right and left viewer Images Ier and Iel are formed on the right and left viewing surfaces ser and sel, respectively. The right viewing surface, ser, has imbedded coordinate frame per. Coordinate frame per is related to frame pv by the transformation Tver. Likewise, the left viewing surface, sel, has imbedded coordinate frame pel. Coordinate frame pel is related to frame pv by the transformation Tvel. The function/process fIpr accepts parameters Idr, and mder and performs the actual decoding of the image Idr to form the image Ier using a polarizing filter decoder. Likewise, the function/process fIpl accepts parameters Idl, and mdel and performs the actual decoding of the image Idl to form the image Iel using a polarizing filter decoder. The combination of images Ier and Iel in the visual processing center, B, forms the image Ib. Ib represents the perceived stereoscopic image M' as represented in the visual processing center B through the use of the function/process fIb.

Coordinate frame pv represents the imbedded coordinate frame of the combined right and left viewing surfaces ser and sel, respectively. pv is related to the stereoscopic image-pair display coordinates system, pd, by the transformation Tdv.

The head position and orientation tracking process tracks the interaction of the combined right and left viewing surfaces, ser and sel, with the display surface, sd, and acquires the transformation Tdv to describe this interaction. The eye position and orientation tracking process tracks the interaction of each individual right and left viewing surface, ser and sel, with respect to the coordinate frame pv, and acquires the right and left viewing surface transformations, Tver and Tvel.

The overall process steps defined by the process groups A through E in FIG. 6B define interactive process which starts with the acquisition of the transformations Tdv (acquired by the head position and orientation tracking subsystem), Tvel and Tver (acquired by the eye position and orientation tracking subsystem), and Twd (acquired by the display position and orientation tracking subsystem) and the acquisition of the display parameters msd, ss, and sd. The interactive process continues with the process steps A, B, C, D, and E in the given order and then repeats with the acquisition of the above transformations and parameters.

Having described the illustrative embodiments of the present invention, several modifications readily come to mind.

In particular, the display subsystem 6 and display surface 40 maybe realized using the 3-D projection display system and surface disclosed in Applicants copending application Ser. No. 08/339,986.

The system and method of the present invention have been described in great detail with reference to the above illustrative embodiments. However, it is understood that other modifications to the illustrative embodiments will readily occur to persons with ordinary skill in the art. All such modifications and variations are deemed to be within the scope and spirit of the present invention as defined by the accompanying Claims to Invention.

APPENDIX A

Symbols/Operators

| | |
|---|---|
| * | Multiplex Images (temporal, spatial, spectral) |
| M | Model or Objects (virtual or physical) |
| px | Coordinate system x |
| Rx | Space x (virtual or physical) |
| Txy | Transformation between coordinate frames x and y |
| Ix | Image representation x (geometric or pixelated) |
| sx | Surface of image representation x (shown flat but does not need to be) |
| dx | Image data |

APPENDIX B

Symbols in Figure Drawings

| | |
|---|---|
| RA | Model space (real or virtual) |
| RB | Viewing space (virtual) |
| M | Model (real or synthetic, M = (Mr or Ms)) |
| Mr | Real Model |
| Ms | Virtual/Synthetic Model |
| M' | Representation of model by stereoscopic display(virtual) |
| B | Visual processing center |
| pm | Coordinate of model |
| pq | Coordinate of stereoscopic image generation/capture device |
| pcl, pcr | Coordinates of left and right image generation view surfaces |
| pw | Coordinate of virtual representation of model |
| pd | Coordinate of stereoscopic image display surface |
| pv | Coordinate of stereoscopic viewing system |
| pel, per | Coordinates of left and right viewing view surfaces |
| Tmq | Transformation from pm to pq |
| Tqcl, Tqcr | Transformation from pq to pcl and from pq to pcr |
| Twd | Transformation from pw to pd |
| Tdv | Transformation from pd to pv |
| Tvel, Tver | Transformation from pv to pel and from pv to per |
| Icl, Icr | Left and right geometric model image representation |
| Ipl, Ipr | Left and right pixelized image representations of Icl and Icr |
| Is | Stereoscopic multiplexed (time, spatial, frequency, etc.) image representation of Ipl and Ipr |

APPENDIX C

| | |
|---|---|
| Isl, Isr | Left and right components of Is (for reference) |
| Id | Is as represented on a stereoscopic display surface |
| Idl, Idr | Left and right components of Id |
| Iel, Ier | Left and right images representations on the viewing view surfaces |
| Ib | Perceived image in the vision processing center B |
| dl, dr | Supplemental left and right display information |
| scl, scr | Left and right geometric model image representation surfaces (size and aspect ratio information) |
| spl, spr | Left and right pixelized image representations surfaces (resolution and aspect ratio information) |
| ss | Stereoscopic multiplexed image representation surface (resolution and aspect information) |
| sd | stereoscopic display surface (size and aspect information) |
| sel, ser | Left and right image viewing view surfaces |
| mmcr, mmcl | Optical or virtual geometric mapping from M to Icl and Icr |
| mcpl, mcpr | Quantization and pixel mapping from Icl to Ipl and Icr to Ipr |
| mpsl, mpsr | Multiplexing process to convert Ipl and Ipr into the stereoscopic image Is |
| msd | Mapping from Is to the display image Id (determined by the projection/display system and optics) msd determines the transformation between the scale of the image generation space and the viewing and display spaces. |
| mder, mdel | Mapping from Id to the viewing system representations Iel and Ier |

What is claimed is:

1. A system for producing and displaying stereoscopically-multiplexed images of either real or synthetic 3-D objects presented or represented in an object space in a way which permits realistic stereoscopic viewing thereof in a virtual reality (VR) viewing environment, said system comprising:

image display means disposed within an image display space, and having a display surface for displaying said stereoscopically-multiplexed images of said real or synthetic 3-D objects;

parameter acquisition means for continuously acquiring a complete set of viewing parameters of a viewer disposed relative to said display surface, said complete set of viewing parameters including information regarding the position and orientation of the eyes of the viewer relative to a first coordinate reference frame embedded within the head of said viewer, information regarding the position and orientation of said head relative to a second coordinate reference frame embedded within said display surface, and information regarding the position and orientation of said image display means relative to a third coordinate reference frame embedded within said image display space;

stereoscopic image pair production means for producing stereoscopic image pairs of said real or synthetic 3-D objects using said complete set of viewing parameters;

stereoscopically-multiplexed image production means for producing said stereoscopically-multiplexed images of said real or synthetic 3-D objects using said stereoscopic image pairs;

image mapping means for mapping said stereoscopic image pairs onto said display surface for viewing by said viewer; and image viewing means through which said displayed stereoscopically-multiplexed images can be viewed by the eyes of said viewer so as to permit realistic stereoscopic viewing of said real or synthetic 3-D objects in said VR viewing environment.

2. The system of claim 1, wherein said VR viewing environment is realized as a flight simulation and training environment, a telerobotic environment, a virtual surgery environment, or a video-gaming environment.

3. The system of claim 2, wherein said virtual surgery environment is a laparascopic or endoscopic surgical environment.

4. The system of claim 1, wherein said stereoscopically-multiplexed images are spatially-multiplexed images (SMIs) of said real or synthetic 3-D objects, and wherein said image display means comprises either an electrically passive micropolarization panel or an electronically reprogrammable micropolarization panel.

5. The system of claim 1, wherein said image viewing means comprises a pair of electrically-passive polarizing eye-glasses.

6. The system of claim 1, realized in the form of desktop computer graphics workstation, adapted for use in virtual reality applications.

7. The system of claim 1, wherein said stereoscopically-multiplexed image production means carrying out either a time-sequential multiplexing process, a spatial-multiplexing process, or a spectral-multiplexing process.

8. The system of claim 1, wherein said image display means comprises an image projection subsystem.

9. The system of claim 8, wherein said image projection subsystem is mounted onto a moveable support platform for use in flight-simulators, virtual-reality games.

10. The system of claim 1, which further comprises object representation means for representing said synthetic object in said object space, so that said stereoscopic image pair production means produces said stereoscopic image pairs of said real or synthetic 3-D objects using said complete set of viewing parameters obtained from said parameter acquisition means.

11. A stereoscopic image display subsystem for displaying and viewing images of virtual 3-D objects represented in image display space, comprising:

a display surface having a first coordinate reference frame symbolically embedded therein;

a head/eye position and orientation tracking subsystem including miniature head/eye imaging cameras for capturing images of a viewer's eyes, an image processing computer for processing said captured images on a real-time basis and producing a first information set representative of position and orientation of the eyes and head of said viewer relative to said first coordinate reference frame; and a display surface position and orientation tracking subsystem, operably associates with said image processing computer, for producing on a real-time basis, a second information set representative of the position and orientation of said display surface relative to a second coordinate reference frame symbolically embedded within said image display space.

12. The stereoscopic image display subsystem of claim 11, which further comprises:

first information processing means for processing said first and second information sets and producing a first complete set of coordinate frame transformations which relate left and right perspective images seen by said viewer, to said second coordinate reference frame with respect to which a geometrical structure of said virtual 3-D objects is referenced.

13. The stereoscopic image display subsystem of claim 12, in combination with a stereoscopic image-pair generation subsystem which comprises:

a pair of object projection surfaces upon which images of said 3-D objects are projected according to left and right perspective image mapping processes, respectively, in order to produce said left and right perspective images;

second information processing means for processing said first complete set of coordinate frame transformations and producing a second complete set of coordinate frame transformations; and mapping process parameterization means for parameterizing said left and right perspective image mapping processes such that said left and right perspective images seen by said viewer are substantially similar to the left and right perspective images projected onto said pair of object projection surfaces.

14. An interactive-based system for producing and displaying stereoscopically-multiplexed images, comprising:

(A) object representation subsystem for representing an object M relative to a first coordinate reference frame pm;

(B) a stereoscopic image display subsystem including (1) a display structure having a display surface positioned relative to a viewer and supporting an array of pixels located at a set of coordinates specified by a coordinate set sd referenced relative to a second coordinate reference frame pd symbolically embedded in said display structure, said display surface being provided for displaying stereoscopically-multiplexed images Is of a virtual object M' corresponding to the object M, and being referenced relative to a third coordinate reference frame pw so that the eyes in the head of said viewer can view said stereoscopically-multiplexed images Is displayed on said display surface;

(2) an eye/head position and orientation tracking subsystem including means for tracking the position and orientation of the head and eyes of the viewer relative to said display surface and producing head and eye position and orientation parameters, means for producing a left eye viewing transformation Tvel parameterized by said head and eye position and orientation parameters transformed to said third coordinate reference frame pw, means for producing a right eye viewing transformation Tver parameterized by said head and eye position and orientation parameters transformed to said third coordinate reference frame pw, and means for producing a head-display viewing transformation Tdv parameterized by said head and eye position and orientation parameters transformed to said third coordinate reference frame pw;

(3) a display surface position and orientation tracking subsystem including means for tracking the position and orientation of said display surface relative to said third coordinate reference frame pw and producing display surface position and orientation parameters, means for producing a head/eye viewing transformation Twd parameterized by said display surface position and orientation parameters transformed to said second coordinate reference frame pd and relating said second coordinate reference frame pd to said third coordinate reference frame pw, means for providing a set of display surface parameters sd representing the size and aspect ratio of said display surface, and means for providing a set of image generation-display mapping parameters msd representing a process of mapping the pixels in the stereoscopically-multiplexed image Is onto pixels of a mapped stereoscopically-multiplexed image Id being displayed on said display surface;

(C) stereoscopic image-pair production subsystem for producing stereoscopic image-pairs, consisting left and right perspective images of said object M, including means for geometrically defining said object M relative to said first coordinate reference frame pm, means for providing a left image acquisition surface scl on which said left perspective image of said object M is acquired and referenced relative to a fourth coordinate reference frame pcl, and a right image acquisition surface scr on which a right perspective image of said object M is acquired and referenced relative to a fifth coordinate reference frame pcr, wherein said left and right object surfaces scl and scr being defined relative to a sixth coordinate reference frame pq, means for producing an object-camera viewing transformation Tmq parameterized by said transformations Twd, Tdv, Tvel, Tver, and said first coordinate reference frame pm, for specifying the position and orientation placement of said left and right image acquisition surfaces scl and scr relative to said first coordinate reference frame pm, means for producing a left image acquisition surface transformation Tqcl parameterized by said Twd, Tdv, Tvel, and Tver, for describing the position and orientation placement of the left image acquisition surface scl relative to said sixth coordinate reference frame pq, means for producing a right image acquisition surface transformation Tqcr parameterized by said Twd, Tdv, Tvel and Tver, for describing the position and orientation placement of the right image acquisition surface scr relative to said sixth coordinate reference frame pq, means for mapping said left perspective image of said object M onto said left image acquisition surface scl using, as parameters, said transformations Tmq, Tqcl, Tdv and Tvel, and said parameters sd and msd, and means for mapping said right perspective image of said object M onto said right image acquisition surface using, as parameters, said transformations Tmq, Tqcr, Tdv and Tver, and said parameters sd and msd; and (D) stereoscopically-multiplexed image subsystem including means for producing a stereoscopically multiplexed image from each of said stereoscopic image-pairs, for mapping onto said display surface by way of said mapping process, and means for producing stereoscopically-multiplexed image parameters ss for representing the resolution and aspect ratio of the stereoscopically multiplexed image.

15. The system of claim 14, wherein said left and right image acquisition surfaces are associated with a real camera located with respective to a real object in object space $R_A$.

16. The system of claim 15, wherein said left and right image acquisition surfaces are associated with a virtual camera located with respective to a virtual (computer-represented) object in image display space $R_B$.

17. An process for producing and displaying stereoscopically-multiplexed images, comprising the steps:

(1A) representing an object M relative to a first coordinate reference frame pm;

(1B) providing a stereoscopic image display subsystem including a display structure having a display surface positioned relative to a viewer and supporting an array of pixels located at a set of coordinates specified by a coordinate set sd referenced relative to a second coordinate reference frame pd symbolically embedded in said display structure, said display surface being provided for displaying stereoscopically-multiplexed images Is of a virtual object M' corresponding to said object M, and being referenced relative to a third coordinate reference frame pw so that the eyes in the head of said viewer can view said stereoscopically-multiplexed images Is displayed on said display surface;

(2A) tracking the position and orientation of the head and eyes of the viewer relative to said display surface and producing head and eye position and orientation parameters;

(2B) producing a left eye viewing transformation Tvel parameterized by said head and eye position and orientation parameters transformed to said third coordinate reference frame pw;

(2C) producing a right eye viewing transformation Tver parameterized by said head and eye position and orientation parameters transformed to said third coordinate reference frame pw; and (2D) producing a head-display viewing transformation Tdv parameterized by said head and eye position and orientation parameters transformed to said third coordinate reference frame pw;

(3A) tracking the position and orientation of said display surface relative to said third coordinate reference frame pw and producing display surface position and orientation parameters;

(3B) producing a head/eye viewing transformation Twd parameterized by said display surface position and orientation parameters transformed to said second coordinate reference frame pd and relating said second coordinate reference frame pd to said third coordinate reference frame pw;

(3C) providing a set of display surface parameters sd representing the size and aspect ratio of said display surface; and (3D) providing a set of image generation-display mapping parameters msd representing a process of mapping the pixels in the stereoscopically-multiplexed image Is onto pixels of a mapped stereoscopically-multiplexed image Id being displayed on said display surface;

(4A) geometrically defining said object M relative to said first coordinate reference frame pm;

(4B) providing a left image acquisition surface scl on which a left perspective image of said object M is acquired and referenced relative to a fourth coordinate reference frame pcl, and a right image acquisition surface scr on which a right perspective image of said object M is acquired and referenced relative to a fifth coordinate reference frame pcr, wherein said left and right object surfaces scl and scr being defined relative to a sixth coordinate reference frame pq;

(4C) producing an object-camera viewing transformation Tmq parameterized by said transformations Twd, Tdv, Tvel, Tver, and said first coordinate reference frame pm, for specifying the position and orientation placement of said left and right image acquisition surfaces scr and scl relative to said first coordinate reference frame pm;

(4D) producing a left image acquisition surface transformation Tqcl parameterized by said Twd, Tdv, Tvel, and Tver, for describing the position and orientation placement of the left image acquisition surface scl relative to said sixth coordinate reference frame pq;

(4E) producing a right image acquisition surface transformation Tqcr parameterized by said Twd, Tdv, Tvel and Tver, for describing the position and orientation placement of the right image acquisition surface relative scr to said sixth coordinate reference frame pq;

(4F) mapping said left perspective image of said object M onto said left image acquisition surface scl using, as parameters, said transformations Tmq, Tqcl, Tdv and Tvel, and said parameters sd and msd; and (4G) mapping said right perspective image of said object M onto said right image acquisition surface scr using, as parameters, said transformations Tmq, Tqcr, Tdv and Tver, and said parameters sd and msd; and (5A) producing a stereoscopically multiplexed image from said left and right perspective images mapped onto said left and right image acquisition surfaces scl and scr, respectively, for mapping onto said display surface by way of said mapping process; and (5B) producing stereoscopically-multiplexed image parameters ss for representing the resolution and aspect ratio of the stereoscopically multiplexed image(s).

18. The process of claim 17, wherein said left and right image acquisition surfaces are associated with a real camera located with respective to a real object in object space $R_A$.

19. The process of claim 17, wherein said left and right image acquisition surfaces are associated with a virtual camera located with respective to a virtual (computer-represented) object in image display space RB.

* * * * *